United States Patent
Kachare et al.

(10) Patent No.: US 11,768,601 B2
(45) Date of Patent: *Sep. 26, 2023

(54) SYSTEM AND METHOD FOR ACCELERATED DATA PROCESSING IN SSDS

(71) Applicant: SAMSUNG ELECTRONICS CO., LTD., Suwon-si (KR)

(72) Inventors: Ramdas P. Kachare, Pleasanton, CA (US); Vijay Balakrishnan, Mountain View, CA (US); Stephen G. Fischer, San Jose, CA (US); Fred Worley, San Jose, CA (US); Anahita Shayesteh, Los Altos, CA (US); Zvi Guz, Palo Alto, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/343,495

(22) Filed: Jun. 9, 2021

(65) Prior Publication Data
US 2021/0294494 A1 Sep. 23, 2021

Related U.S. Application Data

(63) Continuation of application No. 16/270,434, filed on Feb. 7, 2019, now Pat. No. 11,061,574, which is a
(Continued)

(51) Int. Cl.
*G06F 3/00* (2006.01)
*G06F 3/06* (2006.01)
(Continued)

(52) U.S. Cl.
CPC ............ *G06F 3/061* (2013.01); *G06F 3/0656* (2013.01); *G06F 3/0679* (2013.01); *G06F 9/38* (2013.01); *G06F 9/541* (2013.01); *G06F 9/544* (2013.01)

(58) Field of Classification Search
CPC .......... G06F 3/061; G06F 3/0656; G06F 9/38; G06F 9/544; G06F 9/541; G06F 3/0679
See application file for complete search history.

(56) References Cited

U.S. PATENT DOCUMENTS 5,664,219 A 9/1997 Glassen et al.
9,285,827 B2 3/2016 Breakstone et al.
(Continued)

FOREIGN PATENT DOCUMENTS

CN 105046109 A 11/2015
CN 106575279 A 4/2017
(Continued)

OTHER PUBLICATIONS

Jun, Sang-Woo, "Scalable Multi-Access Flash Store for Big Data Analytics", Proceedings of the 2014 ACM/SIGDA International Symposium on Field-Programmable Gate Arrays, ACM 2014, found via Google Scholar (url:https://dspace.mit.edu/bitstream/handle/1721.1/87947/880415120-MIT.pdf;sequence=2), Feb. 2014, 49 pages.
(Continued)

*Primary Examiner* — Tammara R Peyton
(74) *Attorney, Agent, or Firm* — Lewis Roca Rothgerber Christie LLP

(57) ABSTRACT

A system includes a plurality of storage processing accelerators (SPAs), at least one SPA of the plurality of SPAs including a plurality of programmable processors or storage processing engines (SPEs), the plurality of SPEs including n SPEs (n is a natural number greater than zero), where 1st to (n–1) SPEs of the n SPEs are configured to provide an
(Continued)

output of the SPE to a next SPE of the n SPEs in a pipeline to be used as an input of the next SPE; and an acceleration platform manager (APM) connected to the plurality of the SPAs and the plurality of SPEs, and configured to control data processing in the plurality of SPAs and the plurality of SPEs.

20 Claims, 15 Drawing Sheets

Related U.S. Application Data continuation of application No. 16/269,508, filed on Feb. 6, 2019, now Pat. No. 11,112,972.

(60) Provisional application No. 62/775,745, filed on Dec. 5, 2018.

(51) Int. Cl.
  G06F 9/38 (2018.01)
  G06F 9/54 (2006.01)

(56) References Cited

U.S. PATENT DOCUMENTS

| | | |
|---|---|---|
| 9,286,225 B2 | 3/2016 | Mehrotra et al. |
| 9,558,351 B2 | 1/2017 | Dalal et al. |
| 9,569,243 B2 | 2/2017 | King |
| 9,619,167 B2 | 4/2017 | Khan et al. |
| 9,692,825 B2 | 6/2017 | Zachariassen et al. |
| 9,898,312 B2 | 2/2018 | Chamberlain et al. |
| 9,933,976 B2 | 4/2018 | Tsujimoto et al. |
| 10,055,142 B1 | 8/2018 | Bates |
| 10,078,519 B2 | 9/2018 | Weissmann et al. |
| 10,095,647 B2 | 10/2018 | Shippy et al. |
| 10,585,843 B2 | 3/2020 | Kachare et al. |
| 10,592,463 B2 | 3/2020 | Kachare et al. |
| 11,061,574 B2 * | 7/2021 | Kachare .................... G06F 9/38 |
| 11,112,972 B2 * | 9/2021 | Kachare ................ G06F 3/0679 |
| 2002/0146035 A1 | 10/2002 | Tyndall |
| 2013/0343181 A1 | 12/2013 | Stroud et al. |
| 2015/0254003 A1 | 9/2015 | Lee et al. |
| 2016/0094619 A1 | 3/2016 | Khan et al. |
| 2017/0177270 A1 | 6/2017 | Nakagawa et al. |
| 2017/0286170 A1 | 10/2017 | De et al. |
| 2018/0027062 A1 | 1/2018 | Bernat et al. |
| 2018/0052766 A1 | 2/2018 | Mehra et al. |
| 2018/0081569 A1 | 3/2018 | Kan et al. |
| 2020/0183582 A1 | 6/2020 | Kachare et al. |

FOREIGN PATENT DOCUMENTS

| | | |
|---|---|---|
| CN | 106708753 A | 5/2017 |
| KR | 10-2010-0001184 A | 1/2010 |
| KR | 10-2013-0086373 A | 8/2013 |

OTHER PUBLICATIONS

U.S. Office Action dated Sep. 10, 2020, dated U.S. Appl. No. 16/269,508 (8 pages).

* cited by examiner

SYSTEM AND METHOD FOR ACCELERATED DATA PROCESSING IN SSDS

CROSS-REFERENCE TO RELATED APPLICATION(S)

This application is a continuation of U.S. patent application Ser. No. 16/270,434, filed Feb. 7, 2019, which is a continuation of U.S. patent application Ser. No. 16/269,508, filed Feb. 6, 2019, which claims priority to and the benefit of U.S. Provisional Patent Application Ser. No. 62/775,745, filed Dec. 5, 2018, the entire contents of all of which are incorporated herein by reference. The present application is further related to U.S. patent application Ser. No. 16/122,865, which claims priority to and the benefit of U.S. Provisional Patent Application Ser. No. 62/638,904, filed Mar. 5, 2018; U.S. Provisional Patent Application Ser. No. 62/641,267, filed Mar. 9, 2018; U.S. Provisional Patent Application Ser. No. 62/642,568, filed Mar. 13, 2018; U.S. Provisional Patent Application Ser. No. 62/722,656, filed Aug. 24, 2018, the entire content of each of which is incorporated by reference herein for all purposes.

FIELD

One or more aspects of embodiments according to the present invention relate to system and method for accelerated data processing in solid state drives (SSDs).

BACKGROUND

Moving raw data to central processing unit (CPU) for processing and analyzing is expensive in terms of amount of energy consumed. It also increases the burden on resources such as network bandwidth, CPU cycles, and CPU memory. These added resource requirements result in high capex and opex spending. Hence, processing raw data within the storage device (e.g., SSD) is a cost effective solution for data analysis use cases that are needed for monetization of the growing amount of raw data.

The above information in the Background section is only for enhancement of understanding of the background of the technology and therefore it should not be construed as admission of existence or relevancy of the prior art.

SUMMARY

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

Aspects of example embodiments of the present disclosure relate to system and method for accelerated data processing in SSDs.

In some embodiments, a method for offloading and acceleration of application functions from a host device to a storage device method includes: receiving, at an acceleration platform manager (APM) from an application service manager (ASM), application function processing information; allocating, by the APM, a first storage processing accelerator (SPA) from a plurality of SPAs, wherein at least one SPA of the plurality of SPAs includes a plurality of programmable processors or storage processing engines (SPEs), the plurality of SPEs including n SPEs (n is a natural number greater than zero), downloading, by the APM, a micro-code into at least one SPE of the plurality of SPEs in the first SPA, and enabling the plurality of SPEs in the first SPA, wherein once enabled, the at least one SPE of the plurality of SPEs in the first SPA is configured to process data based on the application function processing information; determining, by the APM, if data processing is completed by the at least one SPE of the plurality of SPEs in the first SPA; and sending, by the APM, based on determining that the data processing is completed by the at least one SPE of the plurality of SPEs in the first SPA, a result of the data processing by the SPEs of the first SPA, to the ASM.

In some embodiments, the method further includes extracting, by the APM, data based on the application function processing information; programming, by the APM, one or more arguments received from the ASM in the at least one SPE of the plurality of SPEs in the first SPA; and creating and programming, by the APM, one or more data movement descriptors. The method also includes intercepting, at a host processor, at least one application function call; gathering, at the host processor, the application function processing information including one or more of source of data for processing the application function call, type of processing of the application function call, arguments for the application function call, and destination of results after the data is processed; and receiving, at the ASM in a host device software stack, the application function processing information, wherein based on receiving the application function processing information, the ASM is configured to: select a processor including the APM for application function processing; schedule the data processing in the processor; initiate data transfer direct memory access (DMA) engines to load appropriate data into one or more buffers of the processor; and send an invocation trigger and the application function processing information to the processor.

In some embodiments, the at least one SPA of the plurality of SPAs includes an input buffer or an input staging random-access memory (ISRAM) and an output buffer or an output staging RAM (OSRAM). In some embodiments, the at least one SPE includes an input data buffer (IDB), wherein the at least one SPE is configured to write an output of the at least one SPE into the IDB of the next SPE of the plurality of SPEs in a pipeline. In some embodiments, the IDB is shared between two neighboring SPEs of the plurality of SPEs. In some embodiments, the micro-code running on the at least one SPE of the n SPEs is configured to programmatically generate start of batch and end-of-batch indications to the next SPE of the n SPEs in the pipeline for batch oriented pipelined data processing. In some embodiments, the data is extracted from one or more solid state drives (SSDs) connected to a processor including the APM.

In some embodiments, 1st to (n−1) SPEs of then SPEs are configured to provide an output of the SPE to a next SPE of then SPEs in a pipeline to be used as an input of the next SPE. In some embodiments, the APM is configured to access one or more of instruction RAM (IRAM) and data RAM (DRAM) via the at least one SPE of the plurality of SPEs. In some embodiments, the at least one SPE includes a first bus for the RAM and a second bus for the DRAM. In some embodiments, the DRAM includes scratch pad, input data buffer (IDB), output data buffer (ODB), argument RAM (ARAM), and miscellaneous RAM (MRAM), wherein one or more programmatic SPE features are configured to be based on the MRAM and programmatically accessed by the micro-code running on the at least one SPE as pointers. In some embodiments, an input data buffer (IDB) data available and space available status are generated using IDB read pointer of a first SPE of the n SPEs in a pipeline and an output data buffer (ODB) write pointer of a second SPE previous to the first SPE of the n SPEs in the pipeline to share the IDB in an arbitrary granularity without any overflow or underflow. In some embodiments, the plurality of SPAs is configured to run in parallel on different slices of data received from the ASM.

In some embodiments, a method includes receiving, by a processor, application function processing information; allocating, by the processor, a first storage processing accelerator (SPA) from a plurality of SPAs in the processor, wherein at least one SPA of the plurality of SPAs includes a plurality of programmable processors or storage processing engines (SPEs), the plurality of SPEs including n SPEs (n is a natural number greater than zero); enabling, by the processor, the plurality of SPEs in the first SPA to execute a data processing operation based on the application function processing information; and determining, by the processor, that the data processing operation is completed by at least one SPE of the plurality of SPEs in the first SPA.

In some embodiments, 1st to (n-1) SPEs of then SPEs are configured to provide an output of the SPE to a next SPE of then SPEs in a pipeline to be used as an input of the next SPE, and wherein the application function processing information and an invocation trigger are received at an acceleration platform manager (APM) in the processor from an application service manager (ASM).

In some embodiments, the method further includes downloading, by the processor, a micro-code into the at least one SPE of the plurality of SPEs in the first SPA; programming, by the processor, one or more arguments in the at least one SPE of the plurality of SPEs in the first SPA; creating and programming, by the processor, one or more data movement descriptors; extracting, by the processor, data based on the application function processing information, wherein the data is extracted from one or more solid state drives (SSDs) connected to the processor; sending, by the processor, based on determining that the data processing is completed by the at least one SPE of the plurality of SPEs in the first SPA, a result of the data processing by the SPEs of the first SPA, to the ASM; and resetting or disabling, by the processor, the first SPA.

In some embodiments, the method further includes intercepting, at a host processor, at least one application function call; gathering, at the host processor, application function processing information including one or more of source of data for processing the application function, type of processing, arguments for the application function call, and destination of results; and receiving, at the ASM in a host device software stack, the application function processing information, wherein based on receiving the application function processing information, the ASM is configured to: select the processor for application function processing; schedule data processing in the processor; initiate data transfer direct memory access (DMA) engines to load appropriate data into one or more processor buffers; and send the invocation trigger and the application function processing information to the processor.

In some embodiments, the at least one SPA of the plurality of SPAs includes an input buffer or an input staging random-access memory (ISRAM) and an output buffer or output staging RAM (OSRAM), the at least one SPE includes an input data buffer (IDB), wherein the at least one SPE is configured to write an output of the at least one SPE into the IDB of the next SPE of the plurality of SPEs in a pipeline.

In some embodiments, a method for offloading and acceleration of application functions from a host device to a storage device includes: receiving, at a processor, from a controller, application function processing information; selecting, by the processor, a first storage processing accelerators (SPAs) from a plurality of SPAs in the processor, wherein at least one SPA of the plurality of SPAs includes a plurality of programmable processors or storage processing engines (SPEs)), the plurality of SPEs including n SPEs (n is a natural number greater than zero); transmitting a signal to at least one SPE of the plurality of SPEs of the first SPA to execute a data processing operation according to the application function processing information; determining, by the processor, that the data processing operation is completed by the at least one SPE of the plurality of SPEs in the first SPA; and sending, by the processor, a result of the data processing operation to the controller.

In some embodiments, 1st to (n-1) SPEs of then SPEs are configured to provide an output of the SPE to a next SPE of then SPEs in a pipeline to be used as an input of the next SPE, and wherein the application function processing information including one or more of source of data for processing the application function call, type of processing of application function call, arguments for the application function call, and destination of results after the data is processed.

BRIEF DESCRIPTION OF THE DRAWINGS

These and other features of some example embodiments of the present invention will be appreciated and understood with reference to the specification, claims, and appended drawings, wherein:

DETAILED DESCRIPTION

Figure 1:
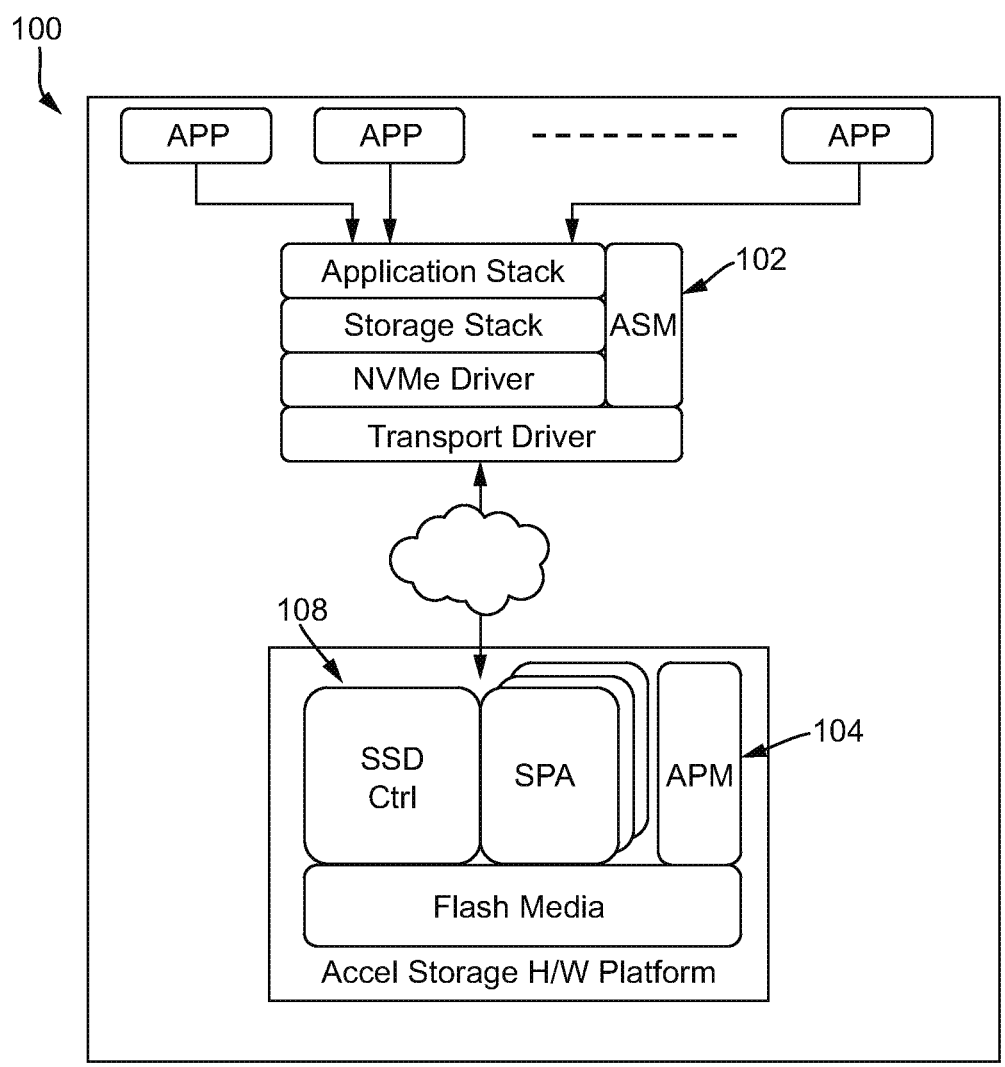
FIG. 1 illustrates a block diagram representation of various components of a storage acceleration system.

The detailed description set forth below in connection with the appended drawings is intended as a description of some example embodiments of system and method for accelerated data processing in SSDs provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

Moving raw data to central processing unit (CPU) for processing and analyzing is expensive in terms of amount of energy consumed. It also increases the burden on resources such as network bandwidth, CPU cycles, and CPU memory. These added resource requirements result in high capital expense (capex) and operational expense (opex) spending. Hence, processing raw data within the storage device (e.g., SSD) is a cost effective solution for data analysis use cases that are needed for monetization of the growing amount of raw data. Moreover, data analytics tasks often read a large amount of data, process it, and reduce it through filtering and other reduction operations. These tasks are a perfect fit for in-SSD acceleration, as they (1) take advantage of the higher available bandwidth within the device, and (2) preserve the limited bandwidth between the SSD and the CPU (i.e. a peripheral component interconnect express (PCIe) interface) by only moving the reduced results.

Example embodiments of the present disclosure describe a field programmable gate array (FPGA)-based hardware platform for complex application acceleration use cases. However, the SPA can be implemented inside SSD controller (e.g., 108 of FIG. 1) device, or NVMe/NVMe-oF bridge device or a SSD controller co-processor device. The SSD controller or NVMe/NVMe-oF devices can be implemented using FPGA or application-specific integrated circuit (ASIC). A SSD controller co-processor device can be implemented using FPGA or ASIC.

Instead of designing single or specific application-specific acceleration hardware, the example embodiments of the present disclosure provide a more general field programmable gate array (FPGA) architecture that may cater to a larger set of applications. The FPGA architecture includes simple programmable processors (named SPEs), arranged in a handful of clusters (e.g., storage processing accelerators (SPAs)), where every cluster (e.g., SPA) contains a group of processors coupled and pipelined together. Incorporating programmable processor in the FPGA architecture increases the flexibility of the architecture, greatly reduces the programming effort, and allows the same design to cater to larger set of applications. For example, the same FPGA architecture may be used to accelerate processing of different file formats (e.g., parquet, orc, etc.) with the designs differing only in the microcode running on the in-FPGA programmable processor. Moreover, small accelerators can be added for specific tasks (i.e., snappy decompression for parquet) and may be incorporated into the clustered design.

SPA architecture design follows specific objectives and goals. The first goal is to offload data processing in or near storage, freeing CPU cycles and improving performance. Second objective is to reduce data movement by performing reduction operations such as filter, limit, join, aggregation, or the like, on large datasets closer to data storage. Offloading such operations, in addition to providing relief on CPU, can significantly reduce the size of the data read by the host, leading to reduced storage, memory and network bandwidth requirements as well as reduced system power. Lastly, SPA architecture should provide flexibility and ease of programming to allow for short development and time to market.

The SPA architecture is envisioned to be used for a variety of complex high level use cases such as Parquet SSD, database applications, or the like. Such use cases may involve the following types of data processing:

1) query processing, including filter, limit, join and aggregation;

2) text processing, including format conversions, parsing, filtering, sorting and interpretations;

3) arithmetic computations, formulate calculations; and 4) regular expressions such as data transformations and pattern search.

In order for the SPA architecture to enable application acceleration use cases, it should have enough computing power to be able to handle complex data processing of wide variety of data formats (relational database, parquet, orc, etc.) or even unknown data formats. This processing should be done at speeds close to hardware rates, so it does not become performance bottleneck of the system and should remain within set power constraints. As data and analytics ecosystem is growing rapidly, new use cases for data storage applications come up frequently. The SPA should be flexible enough to support new future use cases or enhancements of existing use cases easily and efficiently. Lastly, it is important that the SPA architecture is cost effective and allows higher acceleration performance at lower cost.

FIG. 1 illustrates a block diagram representation of various components of a storage acceleration system 100.

In the storage acceleration system 100, the application service manager (ASM) 102 (e.g., a controller, central processing unit, host processor, or the like) provides acceleration orchestration support from host software stack (e.g., application stack, storage stack, non-volatile memory (NVM) express (NVMe) driver). The acceleration platform manager (APM) 104 firmware, running on the embedded processor, provides the acceleration orchestration support from the device side. ASM and APM together facilitate offloading of various acceleration functions, acceleration kernels, and runtime operation onto the SPAs. The hardware platform (e.g., FPGA) may contain multiple instances of SPA. There are different flavors and types of SPA that can be used in a given hardware platform.

Figure 2A:
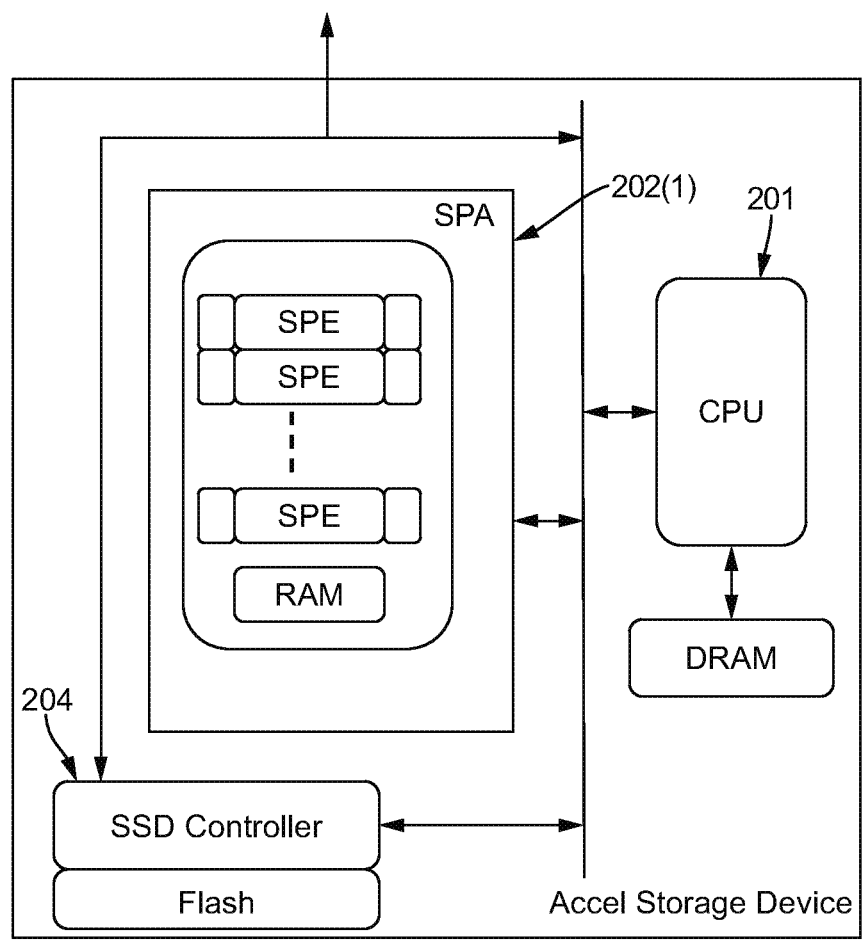
FIGS. 2A-2B illustrate the details of a storage acceleration hardware platform device.
Figure 2B:
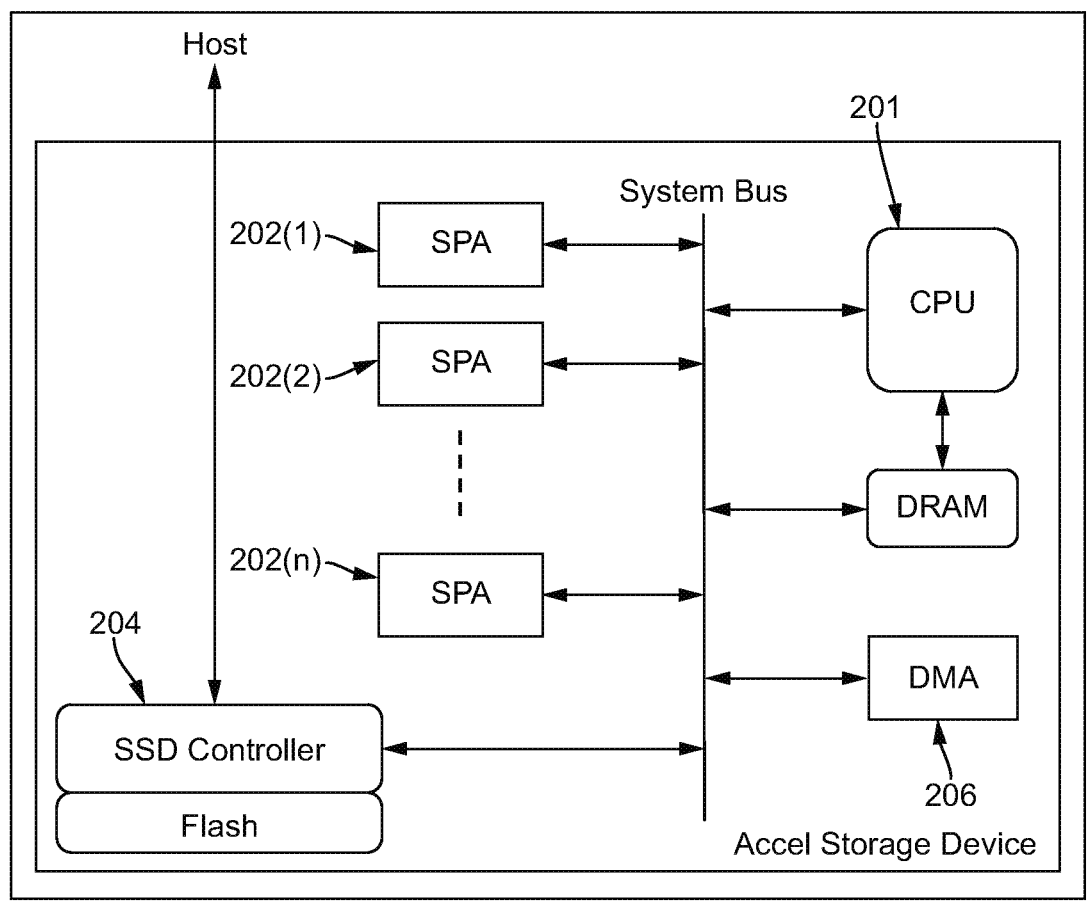

FIGS. 2A-2B illustrate the details of a storage acceleration hardware platform device. In the device of FIGS. 2A-2B, high data processing performance is achieved through pipelined processing within the SPA (e.g., SPA 202(1) as shown in FIG. 2A), and parallel and pipelined processing across multiple SPAs (e.g., 202(1), 202(2), . . . , 202(n), as shown in FIG. 2B), as multiple SPAs are connected to each other in parallel via a system bus (e.g., 308 of FIG. 3) and the multiple SPEs in each SPA are chained together to enable pipelined data processing and transformation. SPAs (e.g., 202(1), 202(2), . . . , 202(n)) are highly customizable, supporting parameterized hardware resources and may be programmed to provide different functionality. With high level of parallelism in data as is the case for most data intensive applications, SPAs can perform the same function on different data streams in parallel. If more computing power is needed, SPAs with different flavor may be chained providing more pipelined processing. Acceleration storage device of FIGS. 2A-2B, workflow is efficiently managed by the embedded orchestrator CPU 201.

Figure 3:
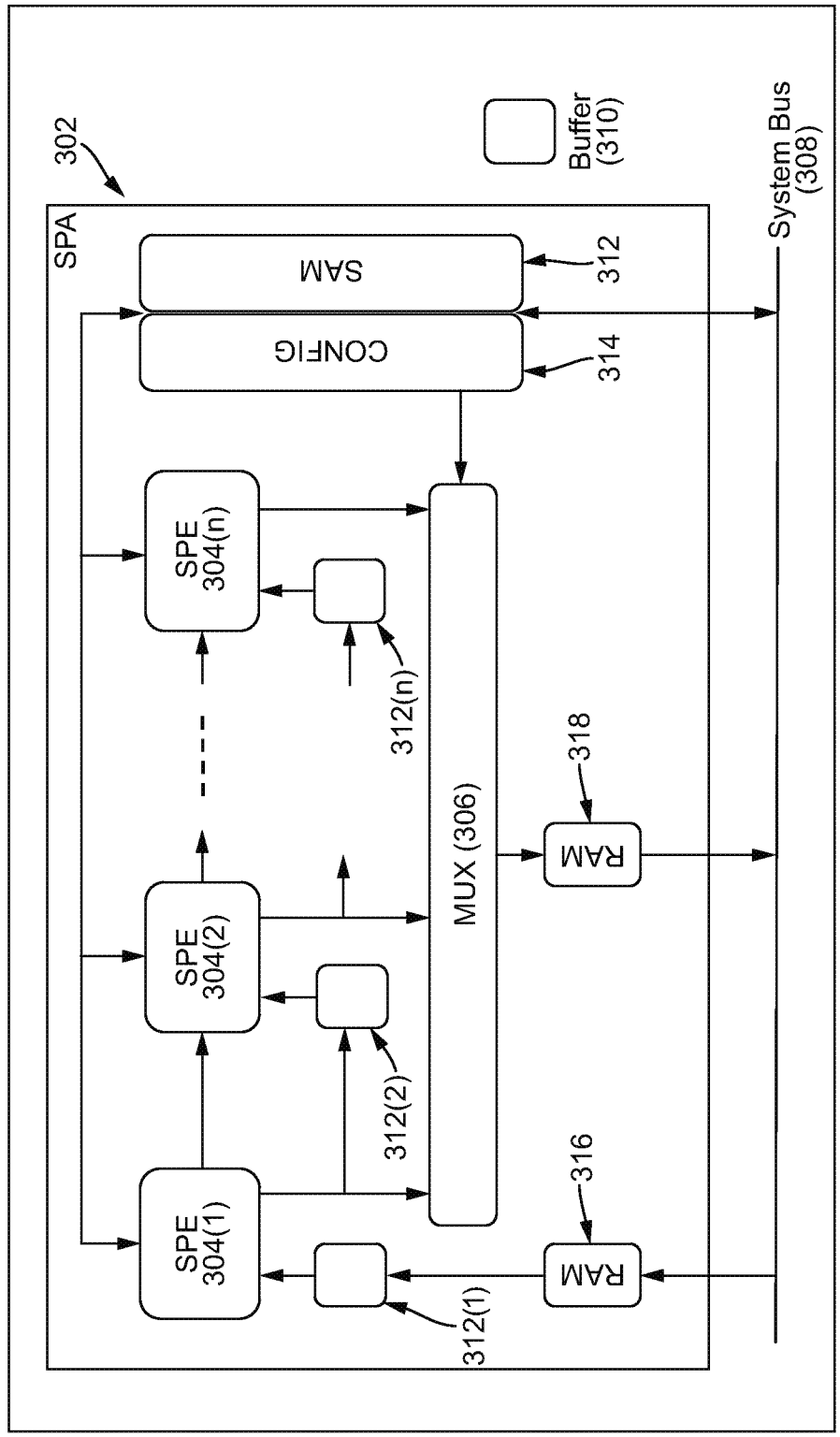
FIG. 3 illustrates a detailed architecture of a storage processing accelerator (SPA)

FIG. 3 illustrates a detailed architecture of a SPA 302. The SPA 302 may be any one of the SPAs 202(1), 202(2), . . . , 202(n), as shown in FIG. 2B. SPA 302 is a pipelined data processing architecture that enables efficient processing of very large datasets. Each SPA (e.g., SPA 302) includes one or more storage processing engines (SPEs) (e.g., 304(1), 304(2), . . . , 304(n)) that are chained together to enable pipelined data processing and transformation.

There are various flavors of SPEs. Hence the SPE interfaces and programming model are architected to be a template. Different light weight cores as well as micro-code engines can be used to create a SPE. It is also possible to have different SPE flavors to co-exist in a single SPA as well as across multiple SPAs. The following flavors of SPEs are currently under consideration: 1) MicroBlaze based; 2) lightweight CPU core such as reduced instruction set computer (RISC)-V based, and 3) micro code engines (MCE) or Micro Sequencer using custom instruction set architecture based.

Each SPE (e.g., 304(1), 304(2), . . . , 304(n)) has a dedicated input buffer (e.g., 312(1), 312(2), . . . , 312(n)), and an output interface. An SPE (e.g., 304(1), 304(2), . . . , 304(n)) can write the outputs or intermediate results into the input buffer (e.g., 312(1), 312(2), . . . , 312(n)) of the next SPE (e.g., 304(1), 304(2), . . . , 304(n)). Different configurations of SPA (e.g., 302) may contain different amount of hardware resources. Namely, a different number of SPEs (e.g., 304(1), 304(2), . . . , 304(n)) can be provisioned to different SPA (e.g., 302) configurations according to the specific function the SPA (e.g., 302) targets. The SPE (e.g., 304(1), 304(2), . . . , 304(n)) outputs are multiplexed (e.g., at the multiplexer 306) into the output buffer that is present on the system bus 308. Each SPA (e.g., 302) also contains an input buffer 316 (e.g., input staging random-access memory (ISRAM)) that is accessible on the system bus 308. The basic data flow to or from each SPA (e.g., 302) is such that an external direct memory access (DMA) engine (e.g., 206 of FIG. 2B) transfers data into the SPA input buffer 316 (e.g., ISRAM). Then, the SPEs (e.g., 304(1), 304(2), . . . , 304(n)) in that SPA (e.g., 302) perform a series of data processing, transformation steps, and finally the results are placed in the output buffer 318 (e.g., output staging RAM (OSRAM)). At that point, a DMA engine (e.g., 206 of FIG. 2B) may transfer out the results into a memory buffer (310) outside the SPA. It may be possible for a DMA engine (e.g., 206 of FIG. 2B) to move data from the output buffer 318 (e.g., OSRAM) of a SPA (e.g., 202(1)) into an input buffer 316 (e.g., ISRAM) of another SPA (e.g., 202(2)). Hence, the SPA architecture enables pipelining of multiple SPAs (e.g., 202(1), 202(2), . . . , 202(n), as shown in FIG. 2B) if necessary for certain applications. Usually SPAs (e.g., 202(1), 202(2), . . . , 202(n), as shown in FIG. 2B) are configured to run in parallel on different slices of the data. All the SPEs (e.g., 304(1), 304(2), . . . , 304(n)) in a SPA (e.g., 302) can be configured through configuration module 314 that is accessible to the embedded processor. The APM firmware running on the embedded processor performs SPA and SPE management. The firmware loads appropriate micro-code into the SPEs (e.g., 304(1), 304(2), . . . , 304(n)) as necessary. Each SPA (e.g., 302) also contains a system memory access module (SAM) 312 that provides double data rate (DDR) memory access to the SPEs (e.g., 304(1), 304(2), . . . , 304(n)) if desired.

Processing data near or inside a storage device (e.g., FPGA+SSD) provides lower response latencies to the applications. It also saves significant amount of energy that is needed to move large datasets to the processor (e.g., host processor). Additionally, it enables distributed computing or in other words offloading and acceleration of certain application functions. The application functions that depend upon a large number of data movements to the host processor from the storage system (e.g., FPGA+SSD) may benefit the most. Offloading such application functions to a storage device (e.g., FPGA+SSD) minimizes computing resources needed, and hence lowers cost of the information technology (IT) infrastructure including compute cycles, memory, network bandwidth, and energy consumed.

The application functions selected for storage offload and acceleration are first intercepted on the host. There are multiple ways and points where such interception can be done. Once an application function call is intercepted, relevant information needed to process that call is gathered. Normally such information contains the source of data, type of processing, and destination of the results.

Once such application function call processing information is gathered, it is passed to a host side software layer (e.g., application stack, storage stack, NVMe driver, as shown in FIG. 1) that would manage the offloading and acceleration process. This host software layer is aware of the acceleration capabilities that are present and available, method to interact with the acceleration platform, as well as the ways to track run-time status of offloaded functions. As ASM (e.g., ASM 102 of FIG. 1) receives the application offload processing information, it selects acceleration platform to use and schedules the processing. It initiates data transfer DMAs (e.g., 206 of FIG. 2B) needed to load the appropriate data into the acceleration platform buffers. It then sends the acceleration invocation trigger and information to the acceleration platform. The APM (e.g., APM 104 of FIG. 1) is the peer of ASM present on the acceleration platform and responds to ASM communication. The communication between the ASM (e.g., ASM 102 of FIG. 1) and the APM (e.g., APM 104 of FIG. 1) can be implemented in many different ways.

The APM (e.g., APM 104 of FIG. 1) firmware running on the acceleration platform provides a set of services that are used by the storage device (e.g., SSD) side application function. The storage device (e.g., SSD) or platform side application firmware has primarily two areas of operation: a) initialization of acceleration engines i.e. SPAs (e.g., 202(1), 202(2), . . . , 202(n), as shown in FIG. 2B) and b) run-time configuration and monitoring of the SPAs (e.g., 202(1), 202(2), . . . , 202(n), as shown in FIG. 2B). The application firmware uses the APM (e.g., APM 104 of FIG. 1) services to implement and manage its acceleration functionality on the platform.

During initialization phase, application firmware gets appropriate SPAs (e.g., 202(1), 202(2), . . . , 202(n), as shown in FIG. 2B) allocated for its usage. Once it gets the handle(s) of SPA (e.g., 302 as shown in FIG. 3), it loads appropriate micro-code into the SPEs (e.g., 304(1), 304(2), . . . , 304(n)) of the SPA (e.g., 302 as shown in FIG. 3). It also configures the other features of SPAs (e.g., 302 as shown in FIG. 3) as necessary.

Figure 4A:
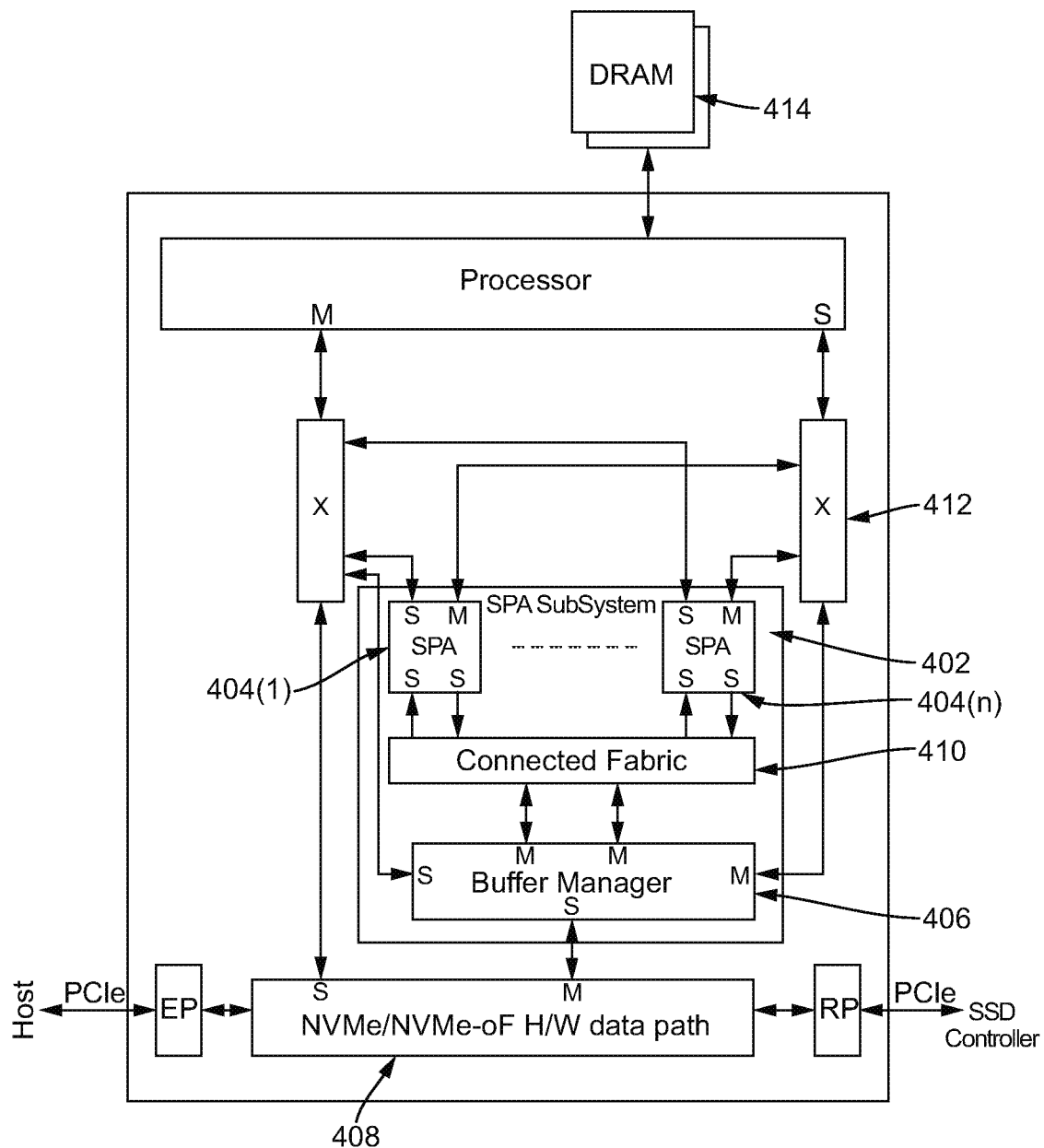
FIG. 4A illustrates a SPA using a non-volatile memory (NVM) express (NVMe) or NVMe over fabric (NVMe-oF) hardware data path of a bridge device.
Figure 5A:
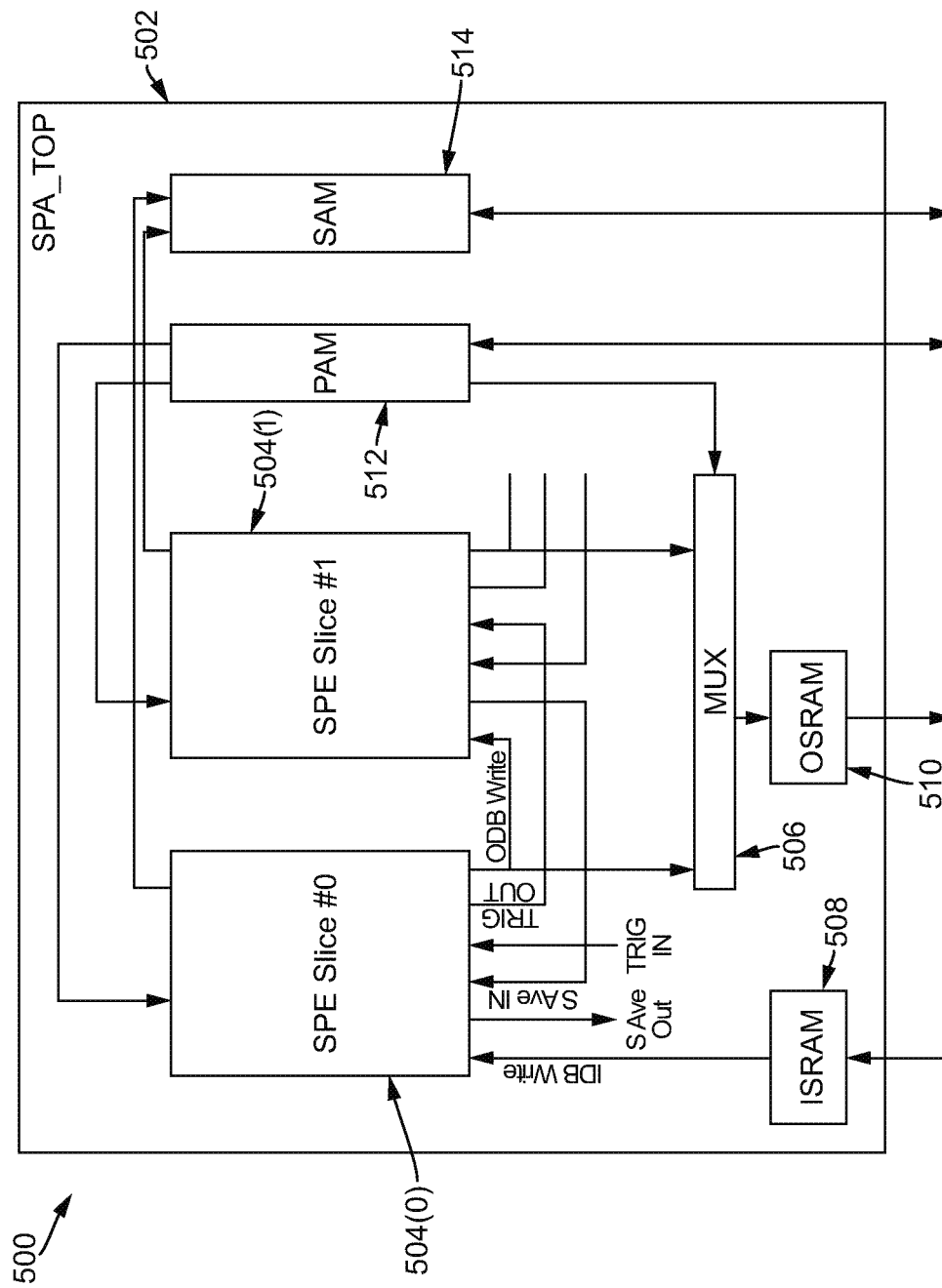
FIG. 5A illustrates a block diagram of a SPA architecture.

During run time, when the offloaded application is invoked by the host software, it receives relevant parameters related to the function call. More specifically the device side application receives information regarding source of the data to be processed, arguments for the call, and destination of the results. The application firmware (e.g., using APM, e.g., APM 104 of FIG. 1) programs any necessary arguments into the SPEs (e.g., 304(1), 304(2), . . . , 304(n)) of the SPA (e.g., 302 as shown in FIG. 3). It sends the input data and result DMA (e.g., 206 of FIG. 2B) instructions to the APM (e.g., APM 104 of FIG. 1). As mentioned earlier, ASM (e.g., ASM 102 of FIG. 1) delivers input data into the storage device buffers. These buffers are called an input staging random-access memory (ISRAM) (e.g., 508, as shown in FIG. 5A). Application firmware writes DMA descriptors to appropriate DMA channels in the buffer manager (e.g., 406, as shown in FIG. 4A). The DMA descriptor provides information regarding moving data received from a SSD controller into the appropriate SPA input buffers called as ISRAM (e.g., 316 of FIG. 3). The application firmware also programs another DMA channel to move the SPA processing results from OSRAM (e.g., 318 of FIG. 3) memory to storage device buffers. Once the DMAs (e.g., 206 of FIG. 2B) are programmed, the application firmware takes the SPEs (e.g., 304(1), 304(2), . . . , 304(n)) out of reset. At that point SPEs (e.g., 304(1), 304(2), . . . , 304(n)) start processing the requested data and produce intended results. Once the processing is finished, application firmware (e.g., using APM, e.g., APM 104 of FIG. 1) sends the results back to the host side application component.

The first SPE (e.g., SPE 304(1)) in the SPA (e.g., spa 302) selected for processing, keeps monitoring arrival of input data. Once sufficient input data is detected in the input data buffer (IDB) (e.g., 312(1)), the first SPE (e.g., 304(1)) starts processing. It reads the data from IDB (e.g., 312(1)), processes it and then writes appropriate intermediate results into the IDB ((e.g., 312(2)) of the next stage (e.g., 304(2). Once a batch of data is completely processed by the first SPE (e.g., SPE 304(1)), it sends a trigger to the second SPE (e.g., 304(2)). At that point the second SPE (e.g., 304(2)) starts processing data in its IDB (e.g., 312(2)). And the process follows with subsequent SPEs (e.g., 304(3), . . . , 304(n)).

When all the requested data is processed by a SPE (e.g., 304(1)), it sets the "done" status. Application firmware monitors all the SPEs (e.g., 304(1), 304(2), . . . , 304(n)) for completion of the processing. Once the results are available and moved out of the SPA (e.g., 302), application firmware may disable the SPA (e.g., 302).

FIG. 4A illustrates a SPA using a non-volatile memory (NVM) express (NVMe) or NVMe over fabric (NVMe-oF) hardware data path of a bridge device. In some embodiments, it may be possible for the NVMe/NVMe-oF hardware data path to use a three port switch or bridge logic. Other possible SPA implementations may be 1) integrated within SSD Controller, 2) SSD Controller Co-processor devices using FPGA, or ASIC 3) NVMe-to-NVMe or NVMe-oF-to-NVMe bridge.

In the SPA implementation of FIG. 4A, the SPA subsystem 402 may include SPAs 404(1), . . . , 404(n), which may be the SPAs 202(1), 202(2), . . . , 202(n), as shown in FIG. 2B.

The buffer manager (BM) module 406 in the SPA subsystem 402 implements a set of on-chip buffers for receiving data from the SSD controller (e.g., 204 of FIGS. 2A-2B). The buffer manager module 406 maintains the set of on-chip buffers backed up with a larger set of buffers in external dynamic random-access memory (DRAM) 414. The buffer manager module 406 receives data from SSD controller (e.g., 204 of FIGS. 2A-2B) and store in a free on-chip buffer, accesses the external DRAM (414) through an interface 412 (e.g., Advanced Extensible Interface (AXI) master interface) in case of on-chip buffer overflows, utilizes DMA channels for moving data to/from SPA sub-system 402 to ISRAM or OSRAM, utilizes processor access module (PAM) interface for receiving DMA descriptors and other configurations. The buffer manager module 406 also receives data from NVMe/NVMe-oF hardware data path 408 and stores that data either in on-chip or off-chip buffers. In some embodiments, buffer manager module 406 may utilize on-chip buffers as cache and provide buffer management, allocation, deallocation, or the like. The buffer manager module 406 may also provide interface to DRAM for overflow buffers and provide interface to PAM (e.g., 512 of FIG. 5A) for configuration, and interface to the SSD controller (e.g., 204 of FIGS. 2A-2B) for data transfer, directly or through an on-chip switch At any given time there can be multiple descriptors active or outstanding.

The following table (Table 2) provides the description of the descriptor fields.

TABLE 2

| Field | Size (bits) | Description |
| --- | --- | --- |
| DSCPTR-ID | 16 | DMA Descriptor Identifier. Max 64K outstanding descriptors |
| Type | 8 | 0: Reserved<br>1: DRAM to SPA<br>2: SPA to DRAM<br>3: SPA to SPA<br>4: DRAM to DRAM |
| Length | 32 | Transfer length in bytes, Max length 4 GB-1. |
| Src Address | 64 | Source Address. Based on Type, it can be DRAM address or SPA-ID |
| Dest Address | 64 | Destination Address. Based on Type, it can be DRAM address or SPA-ID |

The buffer manager 406 provides a completion status for each DMA descriptor. The completion status includes the corresponding descriptor ID so that APM (e.g., APM 104 of FIG. 1) firmware can tie it back to the descriptor request.

The following format (Table 4) is one example used for DMA descriptor completion status.

TABLE 4

| Field | Size (bits) | Description |
| --- | --- | --- |
| DSCPTR-ID | 16 | DMA Descriptor Identifier. Max 64K outstanding descriptors |
| Status | 8 | 0: Successful execution<br>1: Error during execution |

Figure 4B:
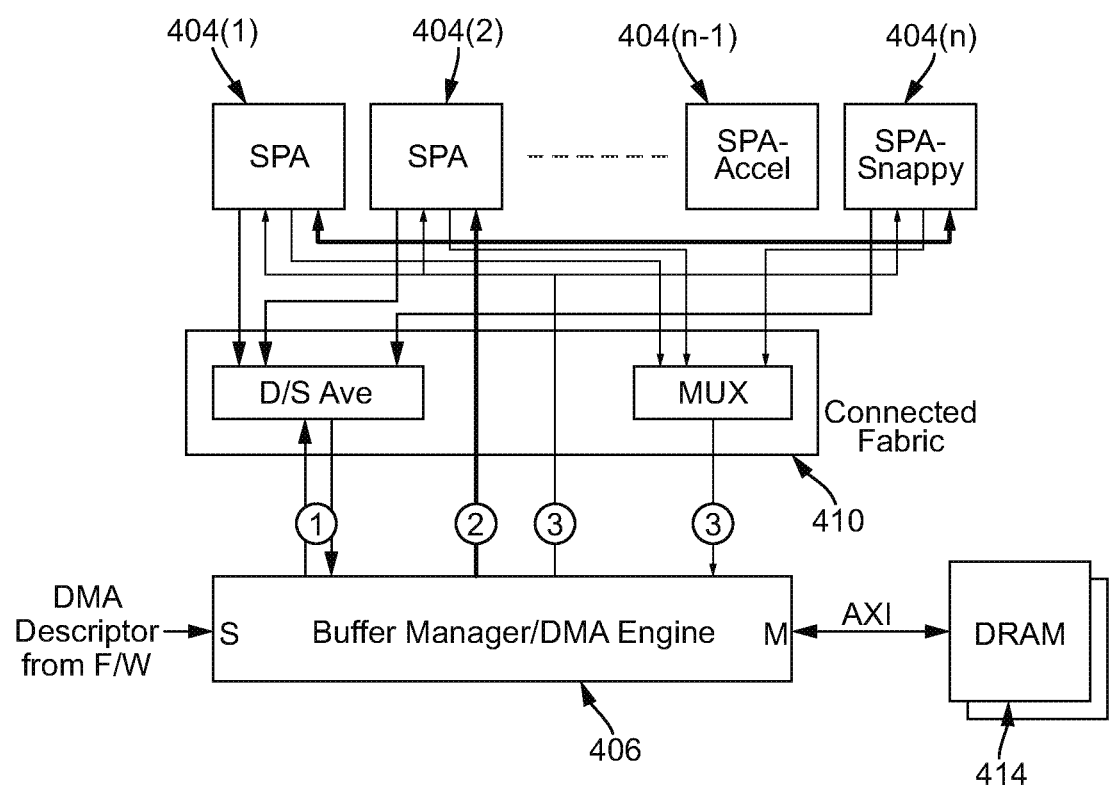
FIG. 4B illustrates a high level architecture of a connected fabric.

FIG. 4B illustrates a high level architecture of the connected fabric 410 of FIG. 4A. The connected fabric module 410 implements data movement or connectivity between a set of SPAs, a set of special SPAs such snappy decompressor, and buffer manager (406) or DMA engine. There are three functions that the connected fabric module 410 performs to enable smooth data movements: 1) provide data available or space available status to buffer manager (406) or DMA engine, 2) provide interface for buffer manager (406) or DMA engine to write data into the SPAs 404(1), . . . , 404(n), or provide data-in interface, and 3) provide interface for buffer manager (406) or DMA engine to read data from the SPAs 404(1), . . . , 404(n), or provide data-out interface.

The following table (Table 5) lists the signals of the interfaces described above.

TABLE 5

| Signal | Width | Polarity | Comment |
| --- | --- | --- | --- |
| 1. Data/Space Available | | | |
| data_ave | 32 | | Per SPA, number of bytes available in OSRAM |
| space_ave | 32 | | Per SPA, number of words of space available in ISRAM |

TABLE 5-continued

| Signal | Width | Polarity | Comment |
|---|---|---|---|
| | | | 2. Data-in |
| data_in | 64 | | Write data from BM/DE to SPA |
| data_in_valid# | | Active High | Per SPA ID, |
| data_in_last | | Active high | |
| | | | 3. Data-out |
| data_out_req# | | Active high | From BM/DE to SPA, per SPA ID |
| data_out_size | 32 | | number of bytes |
| data_out | 64 | | From addressed SPA to BM/DE |
| data_out_valid | | Active high | |
| data_out_last | | Active high | |

The NVMe/NVMe-oF hardware data path module 408 implements NVMe pass-through path for a host to interact with SSD controller (e.g., 204 of FIGS. 2A-2B). A host performs data write and read operation through the NVMe/NVMe-oF hardware data path module 408. The NVMe/NVMe-oF hardware data path module 408 also supports an interface for capturing peer-to-peer data from SSD controller (e.g., 204 of FIGS. 2A-2B) for further processing using SPA (e.g., 202(1) of FIG. 2A or 404(1), ..., 404(n) of FIG. 4A). The NVMe/NVMe-oF hardware data path module 408 implements an address range filter functionality. The programmed address range is used by the host to fetch data from SSD controller (e.g., 204 of FIGS. 2A-2B) for processing by SPA (e.g., 202(1) of FIG. 2A or 404(1), ..., 404(n) of FIG. 4A). It is also possible for a host to store the SPA (e.g., 202(1), 202(2), ..., 202(n) of FIG. 2A or 404(1), ..., 404(n) of FIG. 4A) results back to the SSD controller (e.g., 204 of FIGS. 2A-2B). For that functionality, a host would send NVMe write commands with source address falling in the filter address range programmed in the NVMe/NVMe-oF hardware data path module 408.

Each SPA of SPAs 404(1), ..., 404(n), as shown in FIGS. 4A-4B, has its own address map. There basically two distinct sets of registers: a) global to SPA b) SPE specific. Depending upon number of SPEs present in the SPA, SPE registers have that many copies. In addition to the global configuration, status registers, SPA address map also contains data staging RAMS, ISRAM, and OSRAM. Following table (Table 6) illustrates one example address map and its contents of each SPA.

TABLE 6

| offset-32-bit | Reg # | R/W | Name | Comment |
|---|---|---|---|---|
| 0x0000_0000 | 0 | RO | Version | |
| 0x0000_0008 | 1 | RO | DBG | Debug |
| 0x0000_0018 | 3 | RO | Status | |
| 0x0000_0020 | 4 | RW | Control | |
| 0x0000_0028 | 5 | RW | RESET_SPE | Active low, bit mask, per SPE |
| 0x0000_0030 | 6 | RO | BUSY_SPE | Active high, bit mask, per SPE |
| 0x0000_0038 | 7 | RO | DONE_SPE | Active high, bit mask, per SPE |
| 0x0000_0040 | 8 | RO | TB_AVE_SPE | Trace Buffer available, bit mask, per SPE |
| 0x0000_0048 | 9 | RO | SPA_ISRAM_SPACE_AVE | # of words, debug purpose |

TABLE 6-continued

| offset-32-bit | Reg # | R/W | Name | Comment |
|---|---|---|---|---|
| 0x0000_0050 | 10 | RO | SPA_OSRAM_DATA_AVE | # of words, debug purpose |
| 0x0000_0058 | 11 | RO | DMEM_ERROR | Data memory addressing error, out-of-range address detected |
| 0x0010_0000 | | RW | SPE0_IRAM | Instruction memory |
| 0x0020_0000 | | RW | SPE0_SP | Data memory |
| 0x0030_0000 | | RW | SPE0_ARAM | Argument memory |
| 0x0040_0000 | | RO | SPE0_TB | Trace buffer |
| 0x0040_0008 | | RO | SPE0_IDB_DATA_AVE | # of words |
| 0x0040_0010 | | RO | SPE0_ODB_SPACE_AVE | Next IDB, # of words |
| 0x0110_0000 | | RW | SPE1_IRAM | Instruction memory |
| 0x0120_0000 | | RW | SPE1_SP | Data memory |
| 0x0130_0000 | | RW | SPE1_ARAM | Argument memory |
| 0x0140_0000 | | RO | SPE1_TB | Trace buffer |
| 0x0140_0008 | | RO | SPE1_IDB_DATA_AVE | # of words |
| 0x0140_0010 | | RO | SPE1_ODB_SPACE_AVE | Next IDB, # of words |
| 0x0210_0000 | | RW | SPE2_IRAM | Instruction memory |
| 0x0220_0000 | | RW | SPE2_SP | Data memory |
| 0x0230_0000 | | RW | SPE2_ARAM | Argument memory |
| 0x0240_0000 | | RO | SPE2_TB | Trace buffer |
| 0x0240_0008 | | RO | SPE2_IDB_DATA_AVE | # of words |
| 0x0240_0010 | | RO | SPE2_ODB_SPACE_AVE | Next IDB, # of words |

FIG. 5A illustrates a block diagram of a SPA architecture 500. The SPA 500 includes a set of SPE slices 504(0) and 504(1), an ISRAM 508, an OSRAM 510, a PAM 512, and a SAM 514.

As shown in FIG. 5A, the SPEs or SPE slices 504(0), 504(1) are chained together to enable pipelined data processing and transformation. There can be N number of SPE slices in a given SPA design. Depending on the application, all the SPE slices may not be used. The SPE (e.g., SPE slices 504(0), 504(1)) outputs are multiplexed (e.g., at the multiplexer 506) into the output buffer or OSRAM 510 that is present on the system bus. The multiplexer 506 may select the SPE slices for data processing. The multiplexor 506 may select output from the last SPE slice (e.g., SPE slices 504(0), 504(1)) based on instructions received from the firmware (e.g., APM) running on the embedded processor, as APM performs SPE management. For example, the multiplexer 506 selects the last slice of the pipeline. All the slices of a SPA may not be used for the given application, hence selection of the last slice for outputting.

ISRAM 508 is used by the buffer manager (e.g., buffer manager 406) to deposit data for processing by SPA 500. The data is fetched from the SSD controller and is delivered into the specified SPA 500 (or 404(1)) by the buffer manager (e.g., buffer manager 406). The amount of free space available in the ISRAM 508 is indicated in a SPA 500 register. That free space information is used by the buffer manager (e.g., buffer manager 406) for flow control purposes.

OSRAM 510 is used by the buffer manager (e.g., buffer manager 406) to move SPA 500 processing results to its destination either in an on-chip buffer or in an external DRAM (e.g., 410). The amount of data available for moving out is indicated in a SPA register.

Figures 5B, 5C:
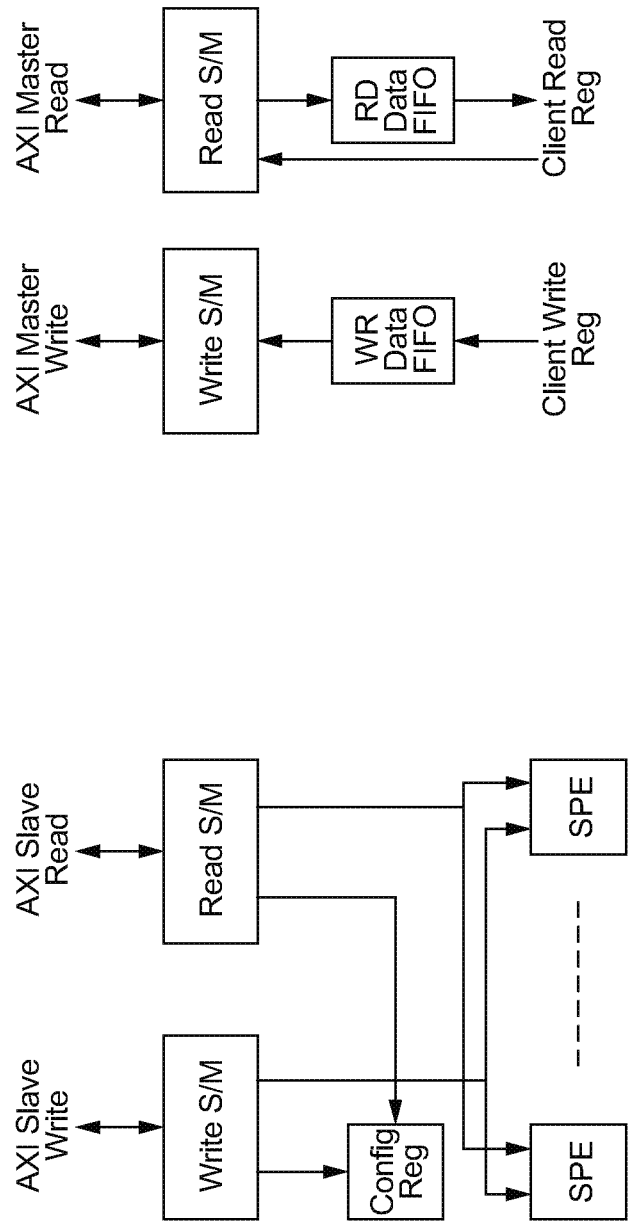
FIG. 5B illustrates a block diagram of a processor access module (PAM).
FIG. 5C illustrates a block diagram of a system memory access module (SAM)

PAM 512 provides SPA configuration access to the firmware running on the embedded processor. The firmware APM running on the embedded processor performs SPA and SPE management. PAM 512 implements the address map of the SPA. It essentially implements an AXI slave interface that is used by the embedded processor to configure, control, and monitor SPA or such module. FIG. 5B illustrates a block diagram of the PAM 512. In FIG. 5B, the PAM 512 module implements read and write state machines to accept read/write transactions from APM. It then decodes the transaction address and performs requested read or write action to SPA global registers or the specified SPE.

SAM 514 provides an AXI master interface for all the SPEs (e.g., 504(0), 504(1)) in the SPA (e.g., 500) to access external DRAM (e.g., 410). All the SPEs (e.g., 504(0), 504(1)) in an SPA (e.g., 500) have tightly coupled high performance data and instruction memories. In rare circumstances, if certain use case needs bigger instruction and/or data memories than the on-chip memories, SPEs (e.g., 504(0), 504(1)) can use this interface. SAM 514 performs arbitration of the SPEs (e.g., 504(0), 504(1)) inside the SPA (e.g., 500) to provide DRAM (e.g., 410) access. FIG. 5C illustrates a block diagram of the SAM 514. In FIG. 5C, the SAM 514 module implements read and write state machines to perform read or write operation to the DRAM memory. It accepts the write data from SPEs through a Write data FIFO and then deposits that data into the DRAM memory at specified address. For read requests, it fetches the data from the DRAM at the specified address and deposits that data into the read data FIFO for SPEs to read it from there.

Figure 5D:
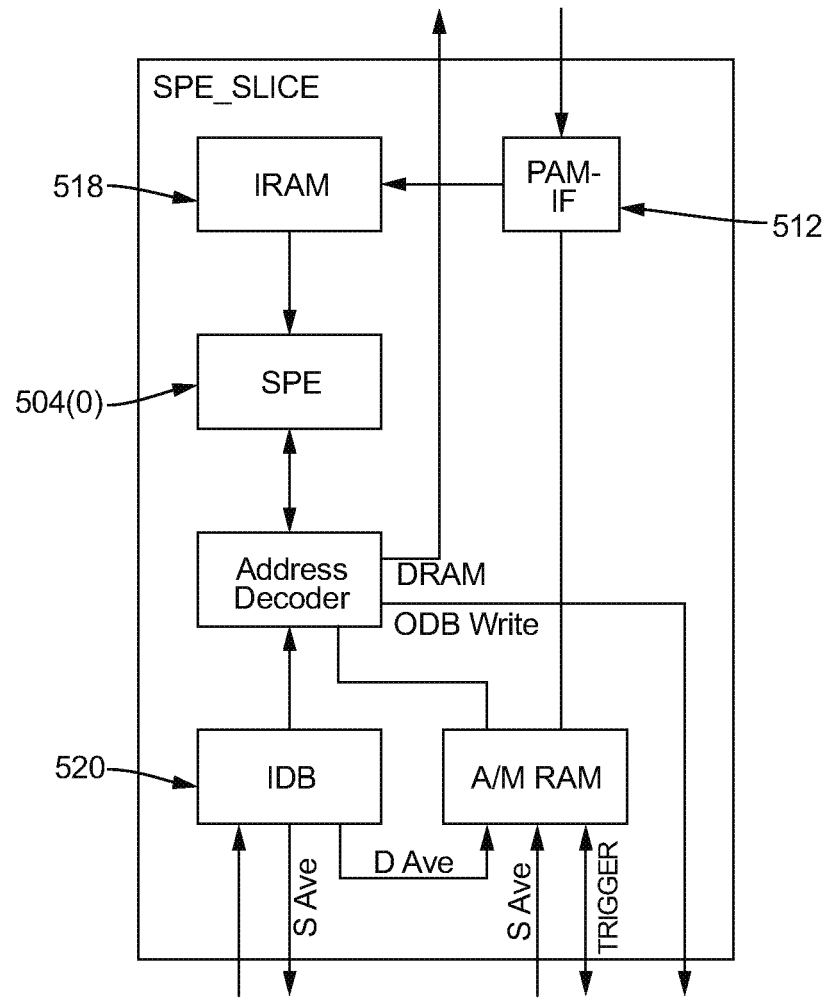
FIG. 5D is a block diagram illustrating details of a storage processing engine (SPE) slice.
Figure 5E:
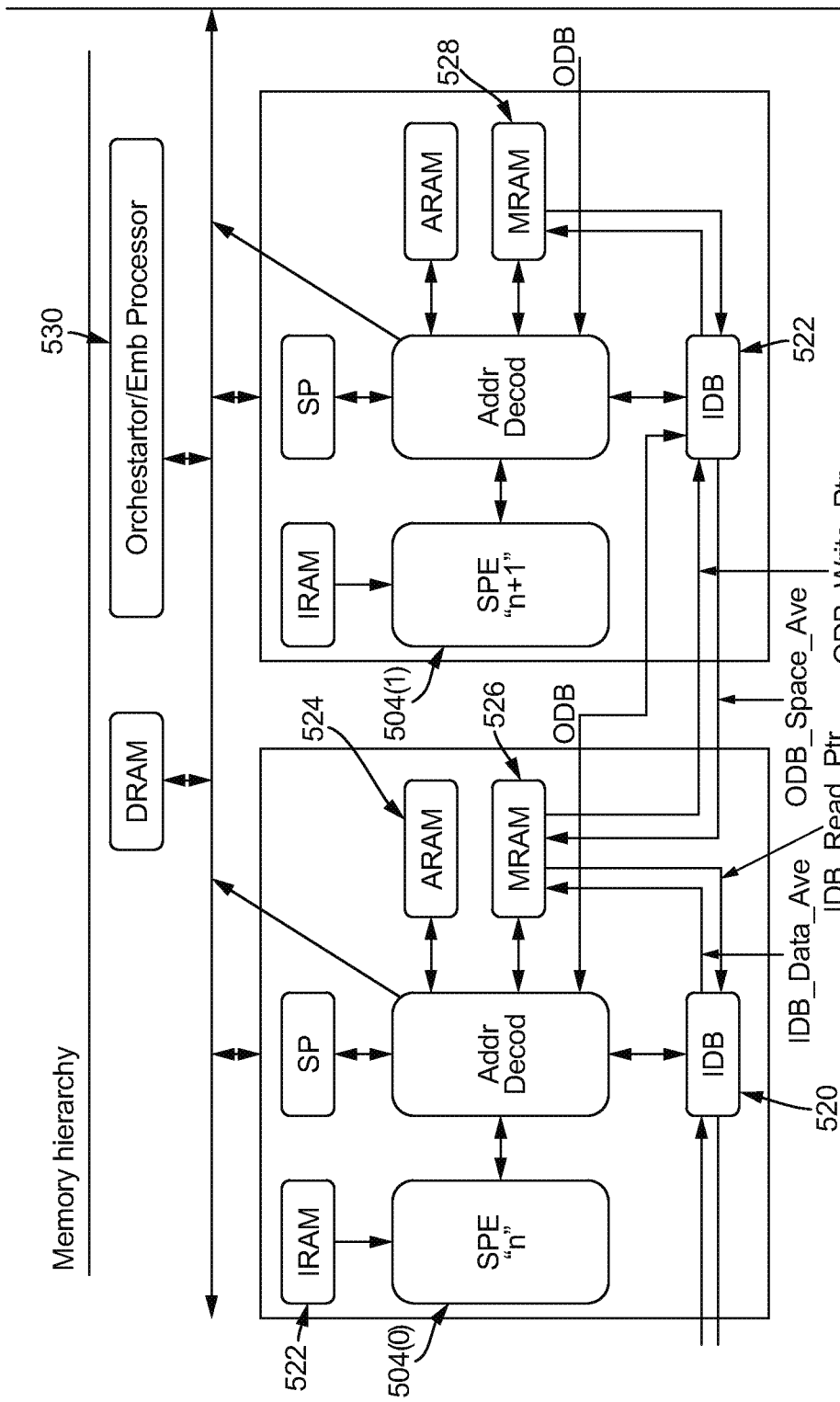
FIGS. 5E-5F illustrate memory hierarchy for two SPE stages and data sharing between the two SPE stages.
Figure 5F:
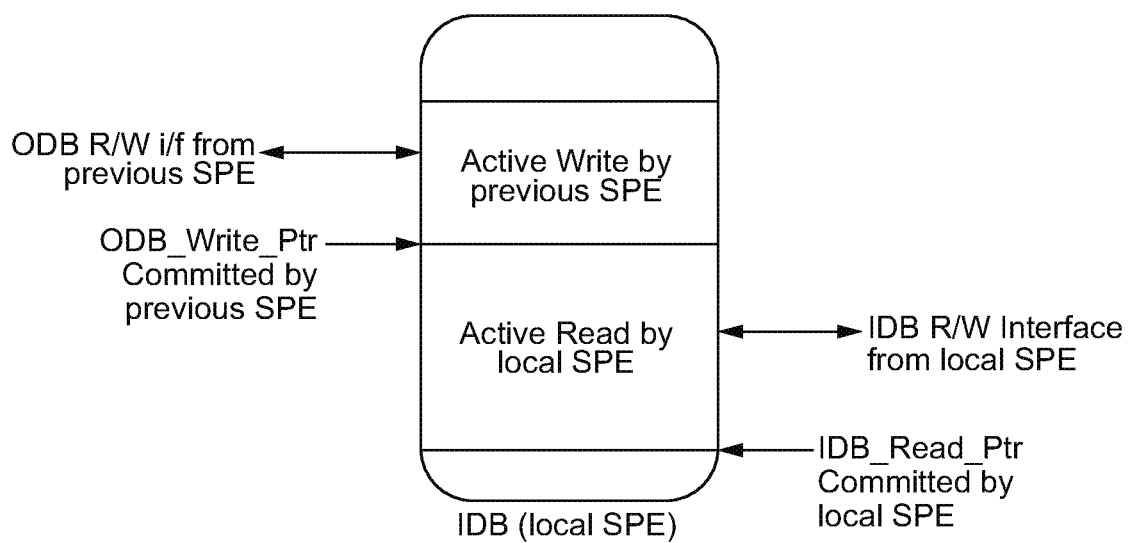

FIG. 5D is a block diagram illustrating details of a SPE slice (e.g., SPE slice 504(0) or 504(1). FIGS. 5E-5F illustrate memory hierarchy for two SPE stages SPE (n) and SPE (n+1) and data sharing between the two SPE stages SPE (n) and SPE (n+1) connected in chaining fashion.

Each SPE has separate buses for instruction memory or instruction RAM (IRAM) and data memory or DRAM. The data memory or DRAM is divided into the following five major groups as indicated in Table 7:

TABLE 7

| Region | Comments |
| --- | --- |
| Scratch Pad | Small variables |
| Input Data Buffer (IDB) | Data to be processed |
| Output Data Buffer (ODB) | Intermediate or final Results |
| Arguments Memory or Arguments RAM (ARAM) | Arguments from firmware |
| Miscellaneous Memory or Miscellaneous RAM (MRAM) | Various buffer status, debug, trace, etc |

An orchestrator or embedded processor 530, which incorporates the APM, can access all the above memories (e.g., IRAM, IDB, ODB, ARAM, MRAM) if or as needed. In some embodiments, IRAM and/or scratch pad size or locations are known at the compilation time to the micro-code (in the SPEs). ARAM, MRAM, IDB, ODB, or Off-chip DDR memory are accessed by SPEs as well-known address pointers.

In FIG. 5D and FIG. 5E, the SPE PAM_IF interface 512 is used by the application firmware to download SPE micro-code into IRAM 518. It is also used to access other data memory or DRAM areas such as arguments space or ARAM 524, debug registers, and status of the SPE that are accessible to the firmware. SPE IDB_WRITE (input) feature is used by the ISRAM module (508) to load input data into the IDB (e.g., 520) of the first SPE slice (e.g., 504(0)). This interface on all the SPE slices (except the first one) is connected to the stage before to create a chaining as shown in FIG. 5E, as the IDB 522 of the SPE stage "n+1" is connected to the SPE stage "n" to create chaining (e.g., as also shown in FIG. 3, as 312 (2), . . . , 312(n) is connected to the stage before to create chaining). SPE IDB_Space_Ave (output) feature indicates number of words of free space in IDB (e.g., 520, 522). This information is used by the buffer manager (e.g., buffer manager 406) to deposit data into the IDB (e.g., 520) of the first SPE slice (e.g., 504(0)). It is also used by SPEs (e.g., SPE stage "n" or SPE 504 (0)) to write the intermediate results using ODB_Write to the next SPE stage (e.g., SPE stage "n+1" or SPE 504(1)). SPE ODB_Space_Ave (input) feature indicates number of words of free space available in the IDB (e.g., 524) of the next stage (e.g., SPE stage "n+1" or SPE 504(1)). It is also used by SPEs (e.g., SPE stage "n" or SPE 504 (0)) to write the intermediate results using ODB_Write to the next SPE stage (e.g., SPE stage "n+1" or SPE 504(1)). SPE TRIGGER_IN (input) feature is a one clock wide trigger pulse. It is used to increment TRIGGER_IN_CNT counter. SPE TRIGGER_OUT (output) feature is a one clock wide trigger pulse. It is used to increment TRIGGER_OUT_CNT counter. SPE_TB (write only) feature points to trace buffer used for debug of micro-code.

In some embodiments, the SPE micro-code for debug purposes writes debug information messages into the trace buffer. Those messages are essentially represented as a series of alpha-numeric characters. Those alphabets and numbers are then displayed on debug monitor by the APM.

SPE_BUSY feature may indicate to the orchestrator or embedded processor that the SPE is busy processing data or batch of data. SPE_SOB_OUT feature generates start of batch pulse to the next SPE in the pipeline that indicates that the SPE has started processing a batch of data. SPE_EOB_OUT feature generates start of batch pulse to the next SPE in the pipeline that indicates that the SPE has ended processing a batch of data. All the above mention programmatic features are MRAM based and programmatically accessed by micro-code running on the SPE (e.g., SPE 504(0) or SPE 504(1)) as pointers. Following table (Table 8) indicates SPE address map with SPE features.

TABLE 8

| offset-32-bit | Reg # | R/W | Name (SPE Feature) | Comment |
| --- | --- | --- | --- | --- |
| 0x00_0000 | | RO | SPE_IRAM | Instruction memory |
| 0x00_0000 | | RW | SPE_SP | Scratch pad |
| 0x10_0000 | | RW | SPE_IDB | Input data buffer |
| 0x20_0000 | | RW | SPE_ODB | Output data buffer |
| 0x30_0000 | | RW | SPE_ARAM | Argument memory |
| 0x40_0000 | | WO | SPE_TB | Trace buffer |
| 0x40_0008 | | RO | SPE_IDB_DATA_AVE | |
| 0x40_0010 | | RO | SPE_ODB_SPACE_AVE | Next IDB |
| 0x40_0018 | | RW | SPE_ODB_WP | Write pointer, updated by SPE microcode. All the data below WP, upto RP is valid. Data block starting at WP is being written. |
| 0x40_0020 | | RW | SPE_IDB_RP | Read pointer, updated by SPE-microcode. All the space below RP, upto WP is free. Data block |

TABLE 8-continued

| offset-32-bit | Reg # | R/W | Name (SPE Feature) | Comment |
|---|---|---|---|---|
| 0x40_0028 | | RO | TRIGGER_IN_CNT | starting at RP is being read. Number of external triggers received |
| 0x40_0030 | | RW | TRIGGER_OUT_CNT | Number of external triggers generated |
| 0x40_0038 | | RW | SPE_DONE | SPE done status |
| 0x40_0040 | | RW | SPE_BUSY | SPE busy status |
| 0x40_0048 | | RW | SPE_BIP_IN | Received Batch In Progress status |
| 0x40_0050 | | RW | SPE_SOB_OUT | Generate SOB pulse to the next SPE |
| 0x40_0058 | | RW | SPE_EOB_OUT | Generate EOB pulse to the next SPE |

As shown in FIG. 5E, the IDB (e.g., 522) of the SPE (e.g., SPE stage "n+1") is ODB of the previous SPE (e.g., SPE stage "n") and there are shared buffer (e.g., IDB 522) between neighboring SPEs (e.g., SPE stage "n" and SPE stage "n+1"). During the data sharing between the neighboring SPEs (e.g., SPE stage "n" and SPE stage "n+1"), the programmatic status IDB_Data_Ave and ODB_Space_Ave (ODB) are accessed through MRAM (e.g., 526, 528), ODB Write commit is provided through ODB_Write_Pointer through MRAM (e.g., 526, 528), IDB Read commit is provided through IDB_Read_Pointer through MRAM (e.g., 526, 528). In data sharing between the neighboring SPEs (e.g., SPE stage "n" and SPE stage "n+1"), shared buffer (e.g., IDB 522) is optimally used instead of traditional ping-pong buffers.

FIG. 5F also illustrates that the IDB (e.g., 522) of the SPE (e.g., SPE stage "n+1") of a current stage is the ODB of the SPE (e.g., SPE stage "n") of the previous stage and there are shared buffer (e.g., IDB 522) between neighboring SPEs (e.g., SPE stage "n" and SPE stage "n+1"). This shared buffer or IDB (e.g., 522) is written by SPE stage "n" using ODB R/W interface and read by the SPE stage "n+1" using IDB R/W interface. In some embodiments, the shared buffer or IDB (e.g., 522) is split into two partitions: 1) write region, actively being written by SPE stage "n", and 2) read region, actively being read by the SPE stage "n+1". The boundaries of these two partitions are marked clearly so that the write and read processes do not conflict with each other. The write partition is the area of the shared buffer between ODB_Write_Ptr and IDB_Read_Ptr. The read partition is the area of the shared buffer between IDB_Read_Ptr and ODB_Write_Ptr. When new data is written, the SPE stage "n" advances the ODB_Write_Ptr to a new value, thereby indicating to the read process that new data is available for reading. Similarly, when the existing data is read and processed, the SPE stage "n+1" advances the IDB_Read_Ptr to a new value, thereby indicating to the write process that new space is available for writing. Such read and write pointer exchanges facilitate smooth flow control between the read and write processes and allow them to exchange arbitrary sized data exchanges. This mechanism avoids overflow and underflow conditions and at the same time achieves the most optimal usage of the share buffer resources without any wastage or underutilization of the shared buffer memory resource. In other words, this mechanism enables a high performance, low resource cost asynchronous data exchanges between two stages of a pipelined data processing system.

Figure 6:
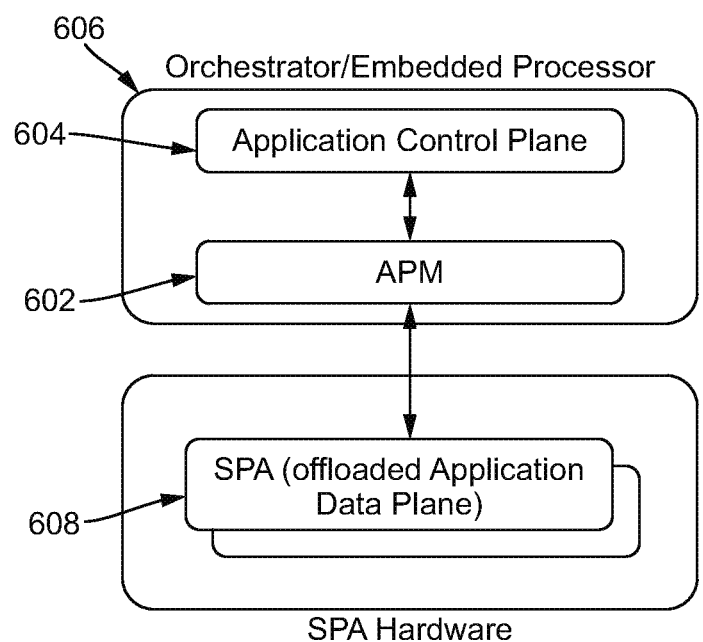
FIG. 6 is a block diagram illustrating a high level operation of an acceleration platform manager (APM)

FIG. 6 is a block diagram illustrating a high level operation of an APM. APM (e.g., APM 602) is a firmware layer that provides a set of services for management and operation of SPA acceleration engines (e.g., SPEs) present in the acceleration storage device. The application control plane 604 firmware uses these calls to set-up necessary SPAs. These services are also used during run time to configure and monitor active SPAs as well as to perform various DMA operations that are necessary in an application work flow.

An application intended for acceleration has primarily two components, a) a control plane, and b) a data plane. The control plane runs on embedded processor (606). The data plane runs on one or more SPEs spread across one or more SPAs 608. There are primarily two phases of operation for application control plane 604. First, after application is launched on the embedded processor 606, it needs to acquire resources needed for acceleration processing and then initialize those resources. The acceleration resources are provided and managed by the APM 602 (firmware running on the embedded processor 606), hence the application needs APM services to procure, and initialize the required type and number of SPAs.

Figure 7:
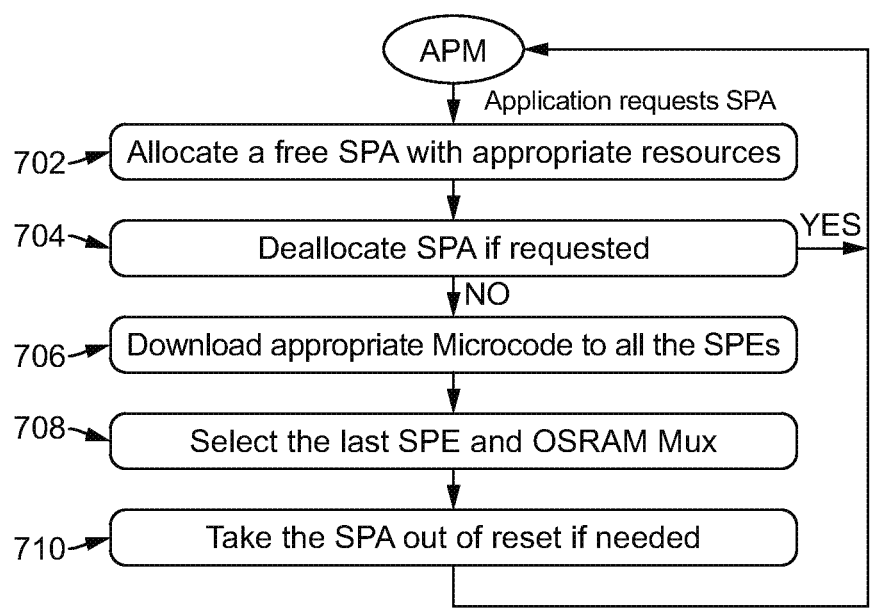
FIG. 7 is a flow chart illustrating a method of SPA initialization.

FIG. 7 is a flow chart illustrating a method of SPA initialization. During initialization, at 702, the APM firmware (e.g., APM 602) allocates a free SPA (e.g., 302 as shown in FIG. 3 or 502 of FIG. 5A) with appropriate resources. At 704, the APM deallocates the SPA, if APM receives such request from ASM. If the deallocation of the SPA is not received at APM, at 706, the APM downloads appropriate micro-code into all the SPEs (e.g., 304(1), 304(2), . . . , 304(n) or 504 (0), 504(1)) of the allocated SPA (e.g., 302 or 502). At 708, the APM selects the last SPE (e.g., 304(n) or 504 (1)) in the allocated SPA (e.g., 302 or 502) and configures the OSRAM multiplexor (506). At 710, the APM may take the allocated SPA (e.g., 302 or 502) out of "reset" if needed.

Figure 8:
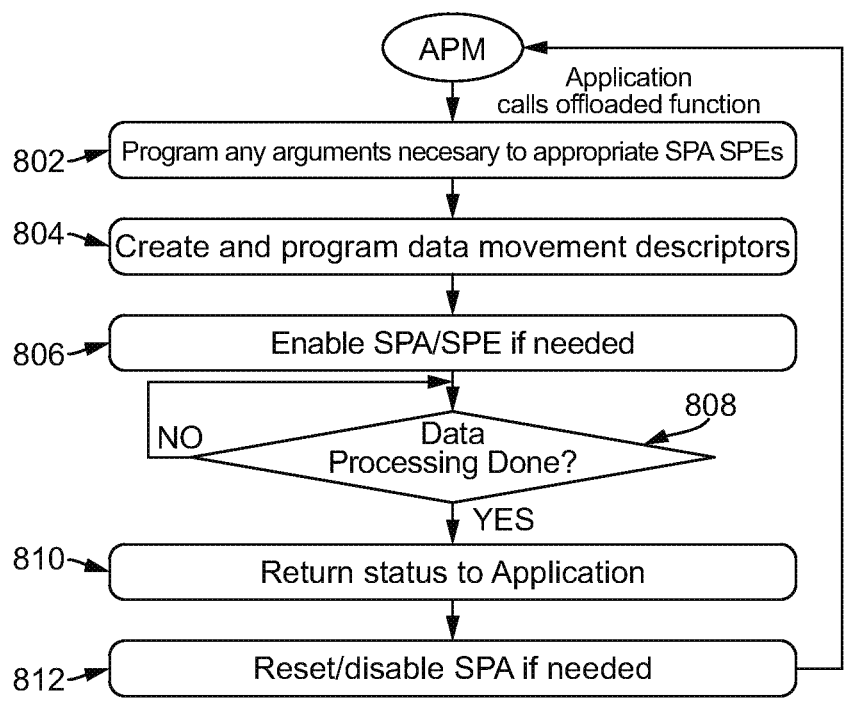
FIG. 8 is a flow chart illustrating a method of SPA runtime operation.

FIG. 8 is a flow chart illustrating a method of SPA runtime operation. The second part of the application control plane (e.g., 604) deals with run-time operations. When the application running on the embedded processor is invoked by the host side run-time software such as ASM, the APM needs to configure the SPAs for data processing, and then triggers the SPAs to get the acceleration work done.

During run time, when the offloaded application is invoked by the host software, APM receives relevant parameters related to the function call. More specifically, the device side application receives information regarding source of the data to be processed, arguments for the call, and destination of the results. At the beginning of the runtime operations the APM may extract relevant information for data processing (from the SSD connected to the embedded processor or FPGA) based on the information regarding the source of the data received from ASM.

At 802, the APM firmware programs any arguments necessary into the appropriate SPA (e.g., SPA 502) SPEs (e.g., 504(1), 504(1)).

At 804, the APM creates and programs the data movement descriptors. For example, the APM writes DMA descriptors to appropriate DMA channels in the buffer manager (e.g., 406, as shown in FIG. 4A). The DMA descriptor provides information regarding moving data received from a SSD controller into the appropriate SPA input buffers called as ISRAM (e.g., 508). APM also programs another DMA channel to move the SPA (e.g., SPA processing results from OSRAM (e.g., 318 of FIG. 3) memory to external buffers.

At 806, the APM enable the SPEs (e.g., 504(1), 504(1)) in the SPA (e.g., SPA 502). For example, once the DMAs (e.g., 206 of FIG. 2B) are programmed, the APM takes the SPEs (e.g., 304(1), 304(2), . . . , 304(n)) out of reset. At that point SPEs (e.g., 304(1), 304(2), . . . , 304(n)) start processing the requested data and produce intended results. For example, the first SPE (e.g., SPE 304(1)) in the SPA (e.g., spa 302) selected for processing, keeps monitoring arrival of input data. Once sufficient input data is detected in the input data buffer (IDB) (e.g., 312(1)), the first SPE (e.g., 304(1)) starts processing. It reads the data from IDB (e.g., 312(1)), processes it and then writes appropriate intermediate results into the IDB ((e.g., 312(2)) of the next stage (e.g., 304(2). Once a batch of data is completely processed by the first SPE (e.g., SPE 304(1)), it sends a trigger to the second SPE (e.g., 304(2)). At that point the second SPE (e.g., 304(2)) starts processing data in its IDB (e.g., 312(2)). And the process follows with subsequent SPEs (e.g., 304(3), . . . , 304(n)).

At 808, the APM determines if all the requested data is processed by a SPE. When all the requested data is processed by a SPE (e.g., 304(1)), the micro-code sets the "done" status. The APM monitors all the SPEs (e.g., 304(1), 304(2), . . . , 304(n)) for completion of the processing.

At 810, once the processing is finished by all the SPEs (e.g., 304(1), 304(2), . . . , 304(n)), the APM return the DONE status to the application control plane which in turn sends the results back to the host side application component.

At 812, once the results are available and moved out of the SPA (e.g., 302), the APM resets or disables the SPA (e.g., 302).

The following table (Table 9) illustrates an APM application programming interface (APIs) that are currently identified.

TABLE 9

| Return Value | API Name | ARG Type | ARG Name |
|---|---|---|---|
| apm_status_t | apm_init | void | |
| apm_status_t | apm_spa_alloc | u32 | spe_count_needed |
| | | u32 | *spa_id |
| apm_status_t | apm_spa_dealloc | u32 | spa_id |
| apm_status_t | apm_spa_spe_opcode_download | u32 | spa_id |
| | | u32 | spe_id |
| | | char | *file_name |
| apm_status_t | apm_spa_spe_last | u32 | spa_id |
| | | u32 | spe_id |
| apm_status_t | apm_spa_spe_aram_write | u32 | spa_id |
| | | u32 | spe_id |
| | | u32 | Offset |
| | | u8 | *buff |
| | | u32 | buff_size |
| apm_status_t | apm_spa_spe_aram_read | u32 | spa_id |
| | | u32 | spe_id |
| | | u32 | Offset |
| | | u8 | *buff |
| | | u32 | buff_size |
| apm_status_t | apm_spa_set_reset_mask | u32 | spa_id |
| | | u64 | spe_reset_mask |
| apm_status_t | apm_spa_check_done | u32 | spa_id |
| | | u64 | done_bit_mask |
| apm_status_t | apm_spa_load_input_data | u32 | spa_id |
| | | u32 | data_buff_addr |
| | | u32 | Length |
| apm_status_t | apm_spa_get_output_data | u32 | spa_id |
| | | u8 | *buffer |
| | | u32 | Len |
| apm_status_t | apm_spa_get_tb_bit_mask | u32 | spa_id |
| | | u64 | *tb_bit_mask |

TABLE 9-continued

| Return Value | API Name | ARG Type | ARG Name |
|---|---|---|---|
| apm_status_t | apm_spa_reg_dump | void | |
| apm_status_t | apm_spa_spe_opcode_dump | u32 | spa_id |
| | | u32 | spe_id |
| apm_status_t | apm_spa_spe_data_dump | u32 | spa_id |
| | | u32 | spe_id |
| apm_status_t | apm_spa_spe_read_tb | u32 | spa_id |
| | | u32 | spe_id |
| apm_status_t | apm_spa_config_read | u32 | spa_id |
| | | u32 | Offset |
| | | U64 | *value |
| | | u32 | size |
| apm_status_t | apm_spa_config_write | u32 | spa_id |
| | | u32 | Offset |
| | | void | *buf |
| | | u32 | size |
| | apm_move_data | | |
| | apm_sd_start | | |
| | apm_sd_done | | |

The API "apm_init" initializes the APM, the API "apm_spa_alloc" allocates available SPA, the API "apm_spa_dealloc" deallocates a SPA, the API "apm_spa_spe_opcode_download" downloads application micro-code opcode file to a SPE RAM, the API "apm_spa_spe_last" sets the last SPE of a SPA, the API "apm_spa_spe_aram_write" writes application arguments to a SPE ARAM, the API "apm_spa_spe_aram_read" reads data from a SPE ARAM, the API "apm_spa_set_reset_mask" turns on one or more SPE(s) of a SPA, the API "apm_spa_check_done" checks if all SPEs of a SPA are done, the API "apm_spa_load_input_data" loads input block of data from external memory to SPA ISRAM data buffer by programming buffer manager DMA, the API "apm_spa_get_output_data" gets output data from SPA output data buffer (OSRAM) to the specified external memory location, the API "apm_spa_get_tb_bit_mask" gets trace buffer bit mask of a SPA, the API "apm_spa_reg_dump" prints SPA registers, the API "apm_spa_spe_opcode_ dump" dumps SPE opcode, the API "apm_spa_spe_data_dump" dumps SPE data, the API "apm_spa_spe_read_tb" reads SPE trace buffer, the API "apm_spa_config_read" reads value from a SPA configuration register, the API "apm_spa_config_write" writes value to a SPA configuration register.

In application data plane, each SPE slice (e.g., 504(0), 504(1)) is programmed with the application specific micro-code that performs one or more specific data processing or manipulation functions needed for that application. The micro-code on the SPEs (e.g., SPE stage "n+1") waits for the arrival of the input data or intermediate results from the earlier processing stage (e.g., SPE stage "n"). Before processing the input data or results of the earlier stage (e.g., SPE stage "n"), micro-code makes sure that there is enough space in the output data buffer which is nothing but the input data buffer of the subsequent stage. Once these two conditions are fulfilled, it starts the main processing function. The micro-code operates within the bounds of SPE address map (Table 10). The addresses and data structures used by SPE micro-code base structure are described below. The following data structure pointers are well-known from SPE address map.

For example, "IDB_ptr" is a pointer to the data buffer to be processed, "ODB_ptr" is the pointer to the data buffer where results to be deposited, "ARG_ptr" is the pointer to the arguments block if needed, "IDB_Data_Ave_ptr" is a register containing number of words of data available, and "ODB_Space_Ave_ptr" is a register containing number of words of space available for results.

SPE (e.g., SPE stage "n") micro-code accesses data from IDB (e.g., 520) and ODB (e.g., 522) buffers. Every SPA (e.g., 502) has two staging memories (e.g., ISRAM 508 and OSRAM 510) that move data in and out of the SPA (502). Buffer manager (e.g., 406) is in charge of moving data between SPAs (e.g., 404(1), . . . , 404(n)) and DRAM (e.g., 410). Buffer manager (e.g., 406) performs data movements using a set of DMA descriptors. Each DMA descriptor essentially provides a tuple consisting of source address, destination address, length, and certain flags. APM (e.g., 602) firmware (running on the embedded processor) programs the necessary DMA descriptors to buffer manager (e.g., 406) as needed. APM (e.g., 602) constructs the appropriate DMA descriptors based on the arguments received from the applications for data movements. APM provides two APIs to the applications for the purpose of the data movements to/from SPA (e.g., 404(1), . . . , 404(n)) and DRAM (e.g., 410).

Figure 9:
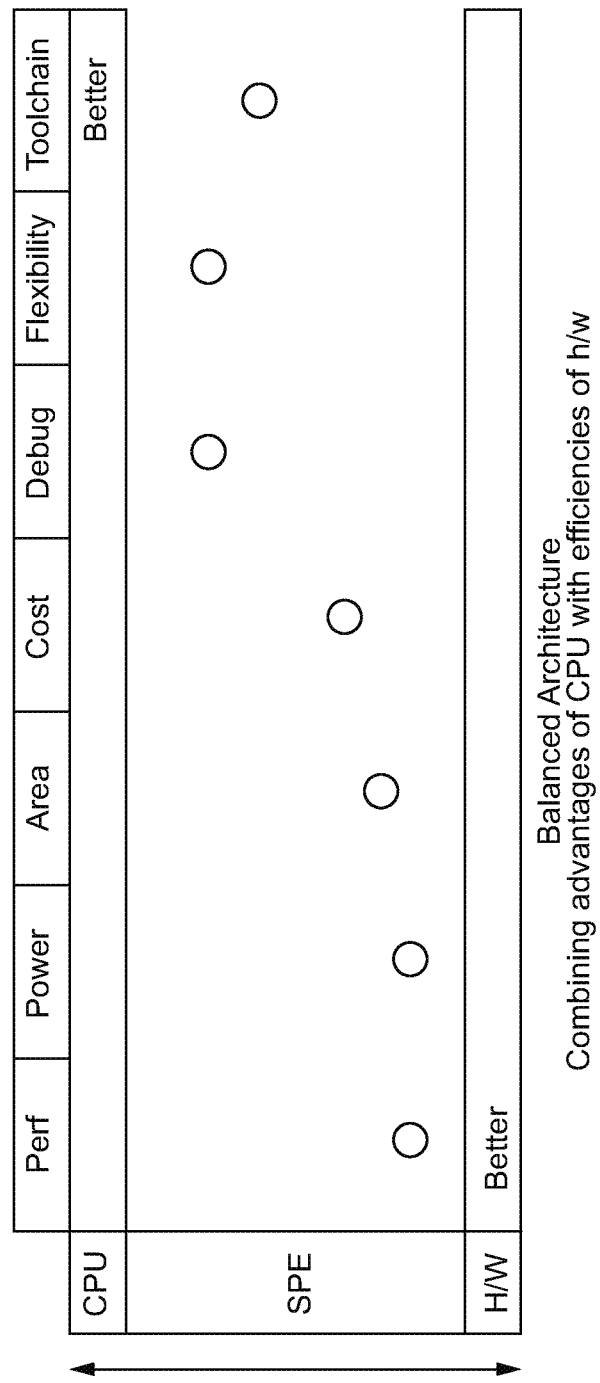
FIG. 9 illustrates a graph.

FIG. 9 illustrates a graph illustrating how the performance, power, area, cost, etc. are when processing data using the SPE architecture (e.g., FIG. 5A) with respect to processing data at host CPU or at the hardware level. The data processing performed using normal CPU provides better flexibility and ease of debug and development, although performance, power, and area may not be the best. On the other end of the spectrum, a hardware based data processing may provide better performance, power, and area, however it may lack the flexibility, and ease of debug and development. Hence the proposed SPE architecture attempts to provide a balance between these two extremes and attempts to achieve best of both the worlds. That is to say that the SPE architecture combines advantages of CPU such as flexibility and ease of development with the benefits of the hardware such as performance and power.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Although exemplary embodiments of system and method for accelerated data processing in SSDs have been specifically described and illustrated herein, many modifications and variations will be apparent to those skilled in the art. Accordingly, it is to be understood that system and method for accelerated data processing in SSDs constructed according to principles of this invention may be embodied other than as specifically described herein. The invention is also defined in the following claims, and equivalents thereof.

What is claimed is:

1. A system comprising:
    an accelerator processor comprising a first processor and a second processor coupled together in a pipeline; and
    a controller connected to the accelerator processor,
        wherein the first processor provides an output to the second processor in the pipeline, and
        wherein the controller controls data processing in at least one of the accelerator processor, the first processor, and the second processor.

2. The system of claim 1, wherein the accelerator processor comprises one or more accelerator processors and the controller comprises a management module, wherein the management module:
    receives first information from a service manager and allocates the accelerator processor;
    provides instructions into the first processor in the accelerator processor;
    obtains data based on the first information;
    programs one or more arguments received from the service manager in the first processor;
    creates and programs one or more data movement descriptors; and
    sends a result to the service manager.

3. The system of claim 2, further comprising a host processor, wherein the host processor:
    intercepts an application function call;
    gathers the first information comprising one or more of source of data for processing the application function call, type of processing of the application function call, arguments for the application function call, and destination of the result based on processed data; and
    receives in a host device software stack, the first information, wherein based on receiving the first information, the service manager in the host processor:
        selects a processor comprising the management module for application function processing;
        schedules the data processing in the processor;
        initiates data transfer direct memory access (DMA) engines to load appropriate data into one or more buffers of the processor; and
        sends an invocation trigger and the first information to the processor.

4. The system of claim 2, wherein the accelerator processor comprises at least one of an input memory and an output memory, wherein the system further comprises a multiplexer that multiplexes outputs of the first processor and the second processor in the accelerator processor into the output memory of the accelerator processor.

5. The system of claim 2, wherein an input data buffer (IDB) is shared between two processors.

6. The system of claim 2, wherein the first processor comprises an input data buffer (IDB), wherein the first processor writes the output of the first processor into an IDB of the second processor in the pipeline.

7. The system of claim 6, wherein the instructions running on the first processor generates batch indications to the second processor in the pipeline.

8. The system of claim 6, further comprising one or more solid state drives (SSDs) connected to a processor comprising the management module, wherein the management module obtains data from the one or more SSDs to be processed by the first processor and the second processor.

9. The system of claim 8, wherein the management module obtains data from the one or more SSDs to be processed by the first processor and the second processor.

10. The system of claim 2, wherein the management module accesses one or more of instruction memory and data memory via the first processor.

11. The system of claim 10, wherein the first processor comprises a first bus for the instruction memory and a second bus for the data memory.

12. The system of claim 11, wherein the data memory comprises at least one of scratch pad, input data buffer (IDB), output data buffer (ODB), argument memory, and miscellaneous memory, wherein one or more features of the first processor and the second processor are based on the miscellaneous memory and accessed by the instructions running on the first processor as pointers.

13. The system of claim 2, wherein the one or more accelerator processors comprise one or more storage processing accelerators (SPAs) and the first processor and the second processor comprise two or more storage processing engines (SPEs), wherein the one or more SPAs run in parallel on different slices of data received at the management module.

14. A system comprising:
    one or more storage processing accelerators (SPAs), an SPA of the one or more SPAs comprising a first processor and a second processor coupled together in a pipeline; and
    a controller connected to the one or more SPAs, the first processor and the second processor,
        wherein the first processor provides an output to the second processor in the pipeline, and
        wherein the controller controls data processing in at least one of the one or more SPAs, the first processor, and the second processor.

15. The system of claim 14, wherein the first processor and the second processor comprise two or more storage processing engines (SPEs), and
    wherein the controller comprises a management module, wherein the management module:
        receives first information from a service manager and allocates the SPA from the one or more SPAs;
        provides instructions into a first SPE of the two or more SPEs in the SPA;
        obtains data based on the first information;
        programs one or more arguments received from the service manager in the first SPE of the two or more SPEs in the SPA;

creates and program one or more data movement descriptors; and sends, a result to the service manager.

16. The system of claim 15, wherein the SPA of the one or more SPAs comprises at least one of an input memory and an output memory, wherein the first SPE comprises an input data buffer (IDB), and wherein the first SPE writes an output of the first SPE into an IDB of a second SPE in the pipeline.

17. The system of claim 16, further comprising one or more solid state drives (SSDs) connected to the controller comprising the management module, wherein the management module obtains data from the one or more SSDs to be processed by the two or more SPEs.

18. The system of claim 15, wherein the management module accesses one or more of instruction memory and data memory via the first SPE, wherein the first SPE comprises a first bus for the instruction memory and a second bus for the data memory, wherein the data memory comprises at least one of scratch pad, input data buffer (IDB), output data buffer (ODB), argument memory, and miscellaneous memory, wherein two or more features of the two or more SPEs are based on the miscellaneous memory and accessed by the instructions running on the first SPE as pointers.

19. A device comprising:
a cluster comprising a first processor and a second processor coupled together in a pipeline; and
a controller connected to the cluster, the first processor, and the second processor,
wherein the first processor provides an output to the second processor in the pipeline, and
wherein the controller controls data processing in at least one of the cluster, the first processor, and the second processor.

20. The device of claim 19, further comprising one or more solid state drives (SSDs) connected to the controller comprising a management module, wherein the first processor and the second processor comprise two or more storage processing engines (SPEs), wherein the two or more SPEs are arranged in clusters, wherein the cluster is a storage processing accelerator (SPA), and wherein the management module extracts data from the one or more SSDs to be processed by the two or more SPEs.

* * * * *